United States Patent
Filson et al.

(10) Patent No.: US 10,411,827 B2
(45) Date of Patent: *Sep. 10, 2019

(54) SYSTEMS AND METHODS FOR DETECTING WIRELESS COMMUNICATION JAMMING IN A NETWORK

(71) Applicant: Google LLC, Mountain View, CA (US)

(72) Inventors: John Benjamin Filson, Mountain View, CA (US); Anthony M. Fadell, Woodside, CA (US); Scott P. Mullins, Gilroy, CA (US); Hirofumi Honjo, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,086

(22) Filed: Aug. 28, 2017

(65) Prior Publication Data
US 2018/0006758 A1 Jan. 4, 2018

Related U.S. Application Data

(63) Continuation of application No. 14/453,455, filed on Aug. 6, 2014, now Pat. No. 9,787,424.

(51) Int. Cl.
| | |
|---|---|
| *H04K 3/00* | (2006.01) |
| *H04L 12/26* | (2006.01) |
| *H04L 12/707* | (2013.01) |
| *H04W 24/00* | (2009.01) |
| *H04L 12/24* | (2006.01) |
| *H04W 24/04* | (2009.01) |

(52) U.S. Cl.
CPC ............. *H04K 3/22* (2013.01); *H04K 3/222* (2013.01); *H04K 3/226* (2013.01); *H04L 43/0811* (2013.01); *H04L 43/10* (2013.01); *H04L 45/22* (2013.01); *H04W 24/00* (2013.01); *H04K 2203/18* (2013.01); *H04L 41/04* (2013.01); *H04W 24/04* (2013.01)

(58) Field of Classification Search
CPC . H04K 3/00; H04K 3/22; H04L 12/26; H04L 12/707; H04L 43/10; H04L 45/22; H04L 43/0811; H04L 41/04; H04W 24/00; H04W 24/04

See application file for complete search history.

(56) References Cited

U.S. PATENT DOCUMENTS

| | | | |
|---|---|---|---|
| 7,202,784 B1 | 4/2007 | Herwig | |
| 9,787,424 B2 | 10/2017 | Filson et al. | |
| 2009/0315991 A1* | 12/2009 | Renkis | H04K 3/226 348/143 |
| 2013/0336130 A1 | 12/2013 | Kore et al. | |

(Continued)

*Primary Examiner* — Kyaw Z Soe
(74) *Attorney, Agent, or Firm* — Kilpatrick Townsend & Stockton LLP

(57) ABSTRACT

An electronic device may include a processor and a network interface that may include a first radio and a second radio. The processor may be configured to perform wireless communication jamming attack detection by occasionally performing clear channel verification utilizing the network interface to determine whether a threshold number of devices' channels are incapacitated in a wireless network within a threshold amount of time and/or by sending a heartbeat signal from the first radio and determining whether the second radio received the heartbeat signal.

20 Claims, 9 Drawing Sheets

(56) References Cited

U.S. PATENT DOCUMENTS

| | | | |
|---|---|---|---|
| 2014/0206343 A1* | 7/2014 | Immendorf | H04K 3/226 |
| | | | 455/423 |
| 2016/0021126 A1 | 1/2016 | Vasseur et al. | |
| 2016/0043827 A1* | 2/2016 | Filson | H04K 3/22 |
| | | | 370/252 |
| 2016/0226707 A1 | 8/2016 | Schallich et al. | |

* cited by examiner

SYSTEMS AND METHODS FOR DETECTING WIRELESS COMMUNICATION JAMMING IN A NETWORK

CROSS-REFERENCE TO RELATED APPLICATIONS

This patent application is a continuation of U.S. Ser. No. 14/453,455, filed Aug. 6, 2014, entitled: "SYSTEMS AND METHODS FOR DETECTING WIRELESS COMMUNICATION JAMMING IN A NETWORK," which is hereby incorporated by reference in its entirety for all purposes.

BACKGROUND

This disclosure relates to network communication and, more particularly, to detecting wireless communication jamming in a wireless network.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices may be connected in a wireless network throughout a home or building complex. For example, a security alarm system may include multiple sensors attached to doors and windows that may detect when the doors and windows are opened and closed. Many of these sensor devices may communicate wirelessly with a hub device. The hub may also be in wireless communications with other electronic devices, such as thermostats, appliances, air conditioning units, hazard detectors, routers, wall switches, to name a few. The electronic devices may communicate with the hub and/or each other using one or more wireless communication channels.

Yet wireless networks may be susceptible to wireless jamming. Indeed, a jamming device might be able to jam communication between two devices by adding large amounts of noise to the wireless channel(s) over which the electronic devices are attempting to communicate. With all the noise in the wireless channels, the electronic devices may be unable to send or receive data. In some cases, the electronic devices may not even recognize that the noise is present. Rather, the electronic devices may simply fail to receive communication from each other, which could occur for many reasons other than jamming. A first device may stop communicating with second device, for instance, when a battery in the first device goes dead. In other words, an electronic device may not discern whether communication by a sending electronic device is not occurring due to innocent (e.g., power loss) or malicious (e.g., wireless jamming) reasons.

As a result, it may be possible for someone to jam a wireless network within a home or building complex to interrupt normal operation of the network. In some cases, communication between the electronic devices may be disabled without alerting the network owner or operator or the authorities. For example, security systems that rely on a wireless network might be jammed and the communication between the sensors and the hub may be blocked. Thus, a building might be broken into without tripping the security system because the sensor may not be able to notify the hub that it has been breached.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

This disclosure relates to a smart-home network enabled to detect whether it is being subjected to a jamming attack. However, this disclosure is not limited to home networks, and it may apply to any environment that utilizes electronic devices wirelessly communicating with each other, such as an office, airport, restaurant, hospital, and so forth. Wireless networks may be susceptible to wireless jamming. Indeed, certain mischievous characters may attempt to jam the wireless network utilized in such environments by utilizing a radio transmitter or transceiver to overwhelm the wireless network with noise in the frequencies used by devices on the network. The present disclosure remedies this devious act by providing techniques to detect the jamming attack and to notify the homeowner and/or authorities once detected.

In a first embodiment, a hub device electronic device is disclosed that may include a processor, a network interface that may include a first radio and a second radio. The processor may be configured to perform wireless communication jamming attack detection by occasionally performing clear channel verification utilizing the network interface to determine whether a threshold number of devices' channels are incapacitated in a wireless network within a threshold amount of time, and/or by sending a heartbeat signal from the first radio and determining whether the second radio received the heartbeat signal.

In a second embodiment, a tangible, non-transitory computer-readable medium including instructions configured to be executed by a hub device electronic device communicably coupled to other electronic devices of a fabric of devices in a wireless network is disclosed. The instructions may include instructions to receive a response from the other devices to a request sent by the hub device electronic device over the wireless network, determine whether a threshold number of the other electronic devices fail to respond to the request within a threshold amount of time, and communicate, via a side channel, a message indicating that a wireless network jamming attack is detected if the threshold number of the other electronic devices fail to respond to the request within the threshold amount of time.

In a third embodiment, a method for detecting a wireless network jamming attack is disclosed that may include transmitting an initial heartbeat signal via a first radio installed in an electronic device, determining, via a processor installed in the electronic device coupled to the first radio and a second radio installed in the electronic device, if there is a loss of communication between the first radio and the second radio based at least upon whether the initial heartbeat signal is received at the second radio, and transmitting, via a side channel, a message indicating a wireless network jamming attack is detected if the processor determines that there is a loss of communication between the first radio and the second radio.

In a fourth embodiment, a system for detecting a wireless network jamming attack is disclosed. The system may include a first home electronic device configured to be installed in a home and a second home electronic device configured to be installed in the home. The first home electronic device may be communicably coupled to the second home electronic device via a wire. The first home electronic device may be configured to detect a wireless network jamming attack, to request the second home electronic device to confirm the wireless network jamming attack, and to trigger an alarm and/or communicate a message via a side channel if the second home electronic device confirms the wireless network jamming attack. The second home electronic device may be configured to confirm the detection of a wireless jamming attack when requested by the first home electronic device by transmitting, via wireless circuitry, requests to other home electronic devices in the home and sending a wireless network jamming attack confirmation to the first home electronic device if a threshold number of other home electronic devices fail to respond to the second home electronic device within a threshold amount of time or sending a message to the first home electronic device indicating that a wireless network jamming attack could not be confirmed if a threshold number of other home electronic devices respond to the second home electronic device within a threshold amount of time.

In a fifth embodiment, a tangible, non-transitory computer-readable medium including instructions configured to be executed by one or more server remote from a home environment that is configured to communicate over a wireless network with a hub device electronic device installed in the home environment is disclosed. The instructions may include instructions to ping the hub device electronic device over the wireless network, receive a response from the hub device electronic device, determine whether the hub device electronic device is being subjected to a wireless network jamming attack if the hub device electronic device does not respond within a threshold amount of time, and communicate a message indicating that the hub device electronic device is not responding if the hub device electronic device fails to respond to the ping.

In another embodiment, a means for detecting wireless communication jamming attacks is disclosed. In yet another embodiment, a means for communicating that a jamming attack is detected via a channel other than the one that is being jammed is disclosed.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
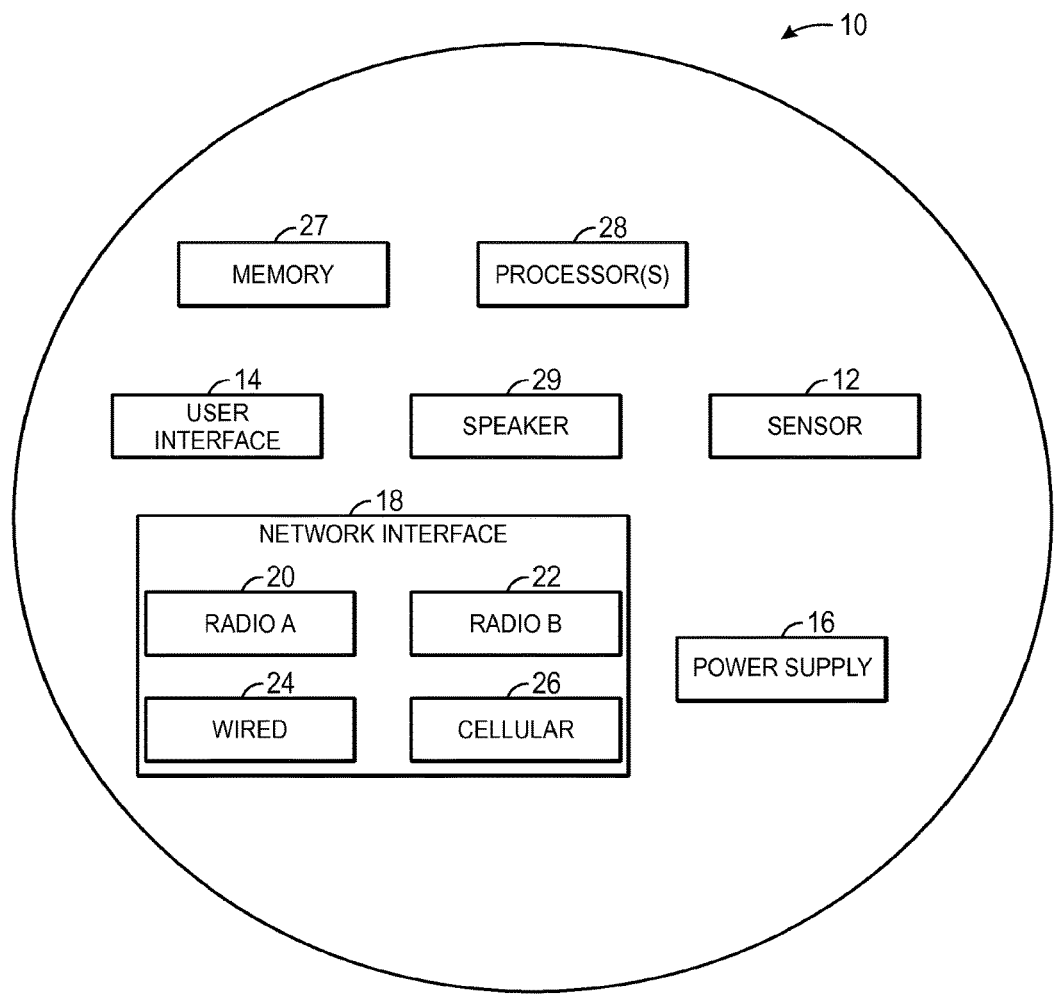
FIG. 1 illustrates a block diagram of a device that may communicate with other devices disposed in a smart-home environment, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

This disclosure relates to a smart-home network enabled to detect whether it is being subjected to a jamming attack. However, this disclosure is not limited to home networks, and it may apply to any environment that utilizes electronic devices wirelessly communicating with each other, such as an office, airport, restaurant, hospital, and so forth. As previously discussed, wireless networks may be susceptible to wireless jamming. Indeed, certain mischievous characters may attempt to jam the wireless network utilized in such environments by utilizing a radio transmitter or transceiver to overwhelm the wireless network with noise in the frequencies used by devices on the network. The present disclosure remedies this devious act by providing techniques to detect the jamming attack and to notify the homeowner and/or authorities once detected. For example, if attackers jam the network and burgle a home, the proactive detection and notification techniques described herein may enable catching the attackers before they get away. In another example, once the jamming attack is detected, a speaker included in a hub device that may be executing the detection techniques may broadcast a warning that the attackers hear and the attack may be thwarted. However, at the very least, the present disclosure may enable homeowners to rest easier knowing that their network is protecting itself from wireless jamming.

There are several embodiments that enable the jamming detection and notification described above. For example, in one embodiment, the smart-home network may include a hub device that wirelessly communicates with several other devices over separate channels. The hub device of this disclosure may represent any suitable device on the wireless network that communicates with more than one other device. The hub device may perform clear channel verification with each device, and if a threshold number of devices do not respond in a threshold amount of time, the hub device may determine that the network is being attacked and the hub device may notify the homeowner via a speaker and/or the authorities via a separate communication channel. In another embodiment, the hub device may communicate wirelessly with remote servers that monitor the hub device. The remote servers may ping the hub device every so often, and if the hub device does not respond within a certain amount of time, the remote servers may determine that the hub device is being attacked and notify the homeowner and/or authorities.

Additionally or alternatively, the hub device may include at least two radios that send heartbeat signals to each other. If one of the radios fails to receive a heartbeat signal from the other radio within a threshold amount of time, the hub device may determine that it is being attacked and notify the homeowner via a speaker and/or the authorities via a separate communication channel. Further, in some embodiments, the hub device may be wired to another electronic device within the smart-home environment, which may be utilized to confirm whether jamming attacks are detected. If the wired device confirms that the hub device has detected a jamming attack, the hub device may notify the homeowner via a speaker and/or the authorities via a separate communication channel.

Smart-Home Network

With the foregoing in mind, FIG. 1 illustrates an example of a device 10 that may communicate with other like devices within a smart-home environment. In one embodiment, the device 10 may include one or more sensors 12, a user-interface component 14, a power supply 16 (e.g., including a power connection and/or battery), a network interface 18 (e.g., including a radio A 20, a radio B 22, a wired component 24, and a cellular component 26), a memory 27, a processor 28, a speaker 29, and the like. Particular sensors 12, user-interface components 14, and power-supply configurations may be the same or similar with each devices 10. However, it should be noted that in some embodiments, each device 10 may include particular sensors 12, user-interface components 14, power-supply configurations, and the like based on a device type or model.

The sensors 12, in certain embodiments, may detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 12 may include temperature sensor(s), humidity sensor(s), hazard-related sensor(s) or other environmental sensor(s), accelerometer(s), microphone(s), optical sensors up to and including camera(s) (e.g., charged coupled-device or video cameras), active or passive radiation sensors, GPS receiver(s) or radiofrequency identification detector(s). While FIG. 1 illustrates an embodiment with a single sensor 12, many embodiments may include multiple sensors 12. In some instances, the device 10 may include one or more primary sensors 12 and one or more secondary sensors 12. Here, the primary sensor(s) 12 may sense data central to the core operation of the device (e.g., sensing a temperature in a thermostat or sensing smoke in a smoke detector), while the secondary sensor(s) 12 may sense other types of data (e.g., motion, light or sound), which can be used for energy-efficiency objectives or smart-operation objectives.

One or more user-interface components 14 in the device 10 may receive input from the user and/or present information to the user. The received input may be used to determine a setting. In certain embodiments, the user-interface components 14 may include a mechanical or virtual component that responds to the user's motion. For example, the user can mechanically move a sliding component (e.g., along a vertical or horizontal track) or rotate a rotatable ring (e.g., along a circular track), or the user's motion along a touchpad may be detected. Such motions may correspond to a setting adjustment, which can be determined based on an absolute position of a user-interface component 14 or based on a displacement of a user-interface component 14 (e.g., adjusting a set point temperature by 1 degree F. for every 10° rotation of a rotatable-ring component). Physically and virtually movable user-interface components 14 can allow a user to set a setting along a portion of an apparent continuum. Thus, the user may not be confined to choose between two discrete options (e.g., as would be the case if up and down buttons were used) but can quickly and intuitively define a setting along a range of possible setting values. For example, a magnitude of a movement of a user-interface component 14 may be associated with a magnitude of a setting adjustment, such that a user may dramatically alter a setting with a large movement or finely tune a setting with a small movement.

The user-interface components 14 may also include one or more buttons (e.g., up and down buttons), a keypad, a number pad, a switch, a microphone, and/or a camera (e.g., to detect gestures). In one embodiment, the user-interface component 14 may include a click-and-rotate annular ring component that may enable the user to interact with the component by rotating the ring (e.g., to adjust a setting) and/or by clicking the ring inwards (e.g., to select an adjusted setting or to select an option). In another embodiment, the user-interface component 14 may include a camera that may detect gestures (e.g., to indicate that a power or alarm state of a device is to be changed). In some instances, the device 10 may have one primary input component, which may be used to set a plurality of types of settings. The user-interface components 14 may also be configured to present information to a user via, e.g., a visual display (e.g., a thin-film-transistor display or organic light-emitting-diode display) and/or the audio speaker 29.

The power-supply component 16 may include a power connection and/or a local battery. For example, the power connection may connect the device 10 to a power source such as a line voltage source. In some instances, an AC power source can be used to repeatedly charge a (e.g., rechargeable) local battery, such that the battery may be used later to supply power to the device 10 when the AC power source is not available.

The network interface 18 may include a component that enables the device 10 to communicate between devices 10. In one embodiment, the network interface 18 may communicate using a standard network protocol, such as Bluetooth® Low Energy (BLE), Dust Networks®, Z-Wave®, WiFi, and ZigBee®. Additionally or alternatively, the network interface 18 may communicate via an efficient network layer protocol (e.g., Thread™). For example, the efficient network layer protocol may enable the device 10 to wirelessly communicate IPv6-type data or traffic using a RIPng routing mechanism and a DTLS security scheme. To communicate wirelessly on the network, the network interface 18 may include a wireless card (e.g., SIM card) or some other transceiver connection. Further, the network interface 18 may include two radios: represented in FIG. 1 as radio A 20 and radio B 22. These radios 20 and 22 may send and/or receive heartbeat signals over a shared or overlapping spectrum usable to both of the radios 20 and 22. For example, the radio A 20 may be a WiFi radio and the radio B 22 may be a Bluetooth® Low Energy radio. Additionally or alternatively, the radios 20 or 22 may be any other suitable radio circuitry. The radios 20 and 22 may use certain overlapping spectrum such that one can detect signals from the other. As will be described in detail below, when one of the radios 20 or 22 fails to receive a heartbeat signal from the other, it may be due to a jamming attack. As such, the device 10 may respond appropriately. For instance, the device 10 may leverage a cellular component 26 (e.g., 3G, 4G, or LTE circuitry) to communicate with devices outside of the local network. For example, the device 10 may contact the authorities over a cellular communication network (e.g., a wireless telecommunications network). The network interface 18 may also include a wired component 24, in certain embodiments. The wired component 24 may enable wired communication (e.g., Ethernet communication) with other devices 10.

The memory 27 may be any suitable article of manufacture that can serve as media to store processor-executable code, data, or the like. These articles of manufacture may represent tangible, computer-readable media (e.g., any suitable form of memory or storage) that may store the processor-executable code used by the processor 28 to perform the presently disclosed techniques. The memory 27 may also be used to store received communication data from devices 10 in order to perform the detection analysis discussed in detail below.

The processor 28 may support one or more of a variety of different device 10 functionalities. As such, the processor 28 may include one or more processors 28 configured and programmed to carry out and/or cause to be carried out one or more of the functionalities described herein. In one embodiment, the processor 28 may include general-purpose processors 28 carrying out computer code stored in memory 27 (e.g., flash memory, hard drive, random access memory), special-purpose processors or application-specific integrated circuits, combinations thereof, and/or using other types of hardware/firmware/software processing platforms. Further, the processor 28 may be implemented as localized versions or counterparts of algorithms carried out or governed remotely by central servers or cloud-based systems, such as by virtue of running a Java virtual machine (JVM) that executes instructions provided from a cloud server using Asynchronous JavaScript and XML (AJAX) or similar protocols. By way of example, the processor 28 may detect when a location (e.g., a house or room) is occupied, up to and including whether it is occupied by a specific person or is occupied by a specific number of people (e.g., relative to one or more thresholds). In one embodiment, this detection can occur, e.g., by analyzing microphone signals, detecting user movements (e.g., in front of a device), detecting openings and closings of doors or garage doors, detecting wireless signals, detecting an IP address of a received signal, detecting operation of one or more devices within a time window, or the like. Moreover, the processor 28 may include image recognition technology to identify particular occupants or objects.

In certain embodiments, the processor 28 may also include a high-power processor and a low-power processor. The high-power processor may execute computationally intensive operations such as operating the user-interface component 14 and the like. The low-power processor, on the other hand, may manage less complex processes such as detecting a hazard or temperature from the sensor 12. In one embodiment, the low-power processor may wake or initialize the high-power processor for computationally intensive processes.

In some instances, the processor 28 may predict desirable settings and/or implement those settings. For example, based on the presence detection, the processor 28 may adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), the processor 28 may initiate an audio or visual indicator of where the person, animal or object is or may initiate an alarm or security feature if an unrecognized person is detected under certain conditions (e.g., at night or when lights are off).

In some embodiments, devices 10 may interact with each other such that events detected by a first device 10 influences actions of a second device 10. For example, a first device 10 can detect that a user has pulled into a garage (e.g., by detecting motion in the garage, detecting a change in light in the garage or detecting opening of the garage door). The first device 10 can transmit this information to a second device 10 via the efficient network layer, such that the second device 10 can, e.g., adjust a home temperature setting, a light setting, a music setting, and/or a security-alarm setting. As another example, a first device 10 can detect a user approaching a front door (e.g., by detecting motion or sudden light pattern changes). The first device 10 may, e.g., cause a general audio or visual signal to be presented (e.g., such as sounding of a doorbell) or cause a location-specific audio or visual signal to be presented (e.g., to announce the visitor's presence within a room that a user is occupying).

By way of example, the device 10 may include a thermostat such as a Nest® Learning Thermostat. Here, the thermostat may include sensors 12 such as temperature sensors, humidity sensors, and the like such that the thermostat may determine present climate conditions within a building where the thermostat is disposed. The power-supply component 16 for the thermostat may be a local battery such that the thermostat may be placed anywhere in the building without regard to being placed in close proximity to a continuous power source. Since the thermostat may be powered using a local battery, the thermostat may minimize its energy use such that the battery is rarely replaced.

In one embodiment, the thermostat may include a circular track that may have a rotatable ring disposed thereon as the user-interface component 14. As such, a user may interact with or program the thermostat using the rotatable ring such that the thermostat controls the temperature of the building by controlling a heating, ventilation, and air-conditioning (HVAC) unit or the like. In some instances, the thermostat may determine when the building may be vacant based on its programming. For instance, if the thermostat is programmed to keep the HVAC unit powered off for an extended period of time, the thermostat may determine that the building will be vacant during this period of time. Here, the thermostat may be programmed to turn off wall switches (e.g., light switch) or other electronic devices 10 when it determines that the building is vacant. As such, the thermostat may use the network interface 18 to communicate with a wall switch device 10 such that it may send a signal to the wall switch device 10 when the building is determined to be vacant. In this manner, the thermostat may efficiently manage the energy use of the building.

It should be understood that the device 10 may include all of the components illustrated (e.g., sensor 12, user interface 14, power supply 16, network interface 18, memory 27, processor 28, speaker 29), a subset of those components, or additional components. For example, some devices 10 may not include a speaker 29, some devices' network interfaces 18 may not include a cellular component 26, some devices' network interfaces 18 may include only one radio or may include more than two radios, and so forth.

Figure 2:
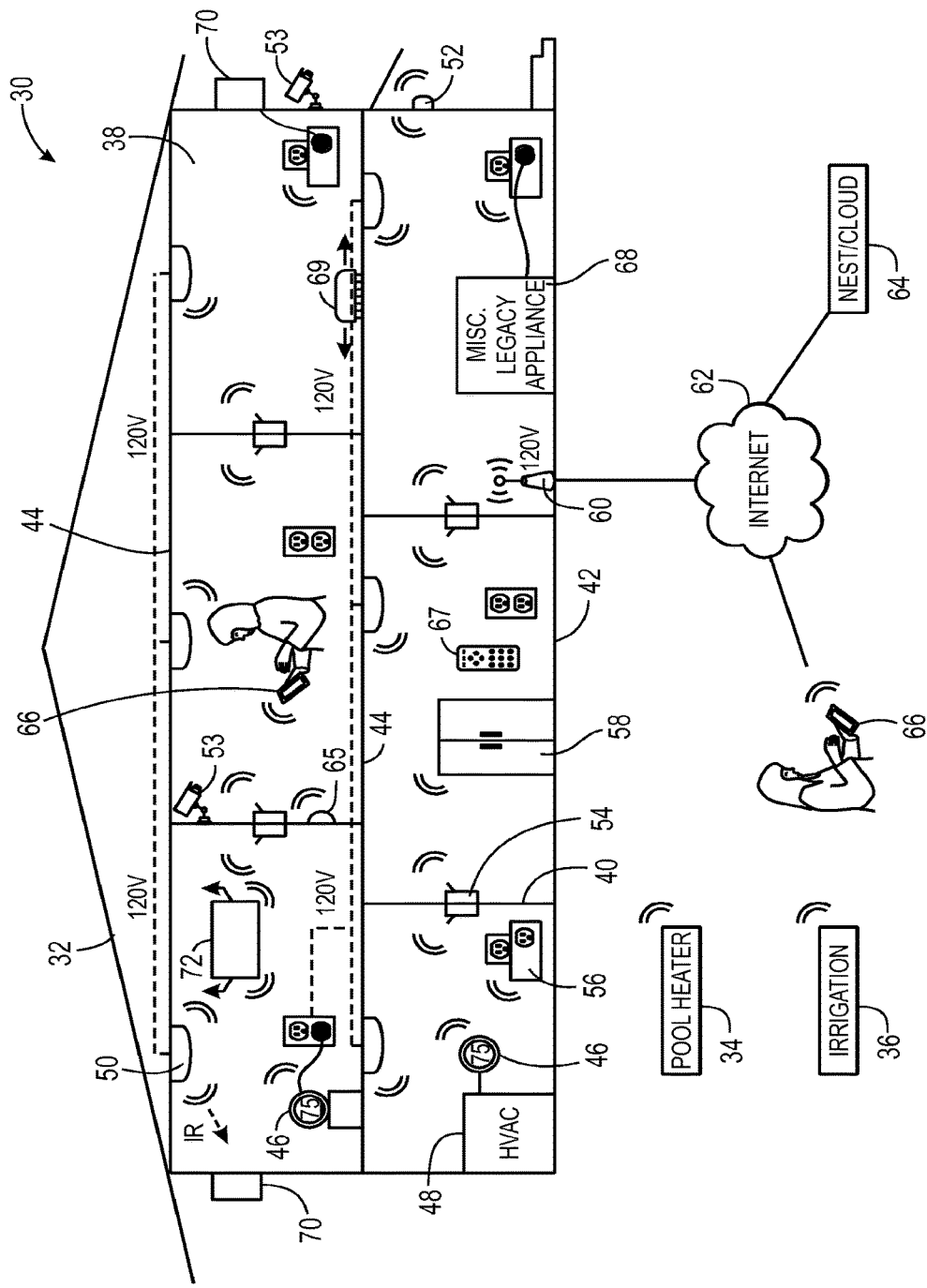
FIG. 2 illustrates a block diagram of a smart-home environment, in accordance with an embodiment.

An example of a smart-home environment 30 within which one or more of the devices 10 of FIG. 1, methods, systems, services, and/or computer program products described further herein can be applicable is illustrated in FIG. 2. The depicted smart-home environment 30 includes a structure 32, which can include, e.g., a house, office building, garage, or mobile home. It will be appreciated that devices can also be integrated into a smart-home environment 30 that does not include an entire structure 32, such as an apartment, condominium, or office space. Further, the smart home environment 30 can control and/or be coupled to devices 10 outside of the actual structure 32. Indeed, several devices 10 in the smart home environment 30 need not physically be within the structure 32 at all. For example, a device 10 controlling a pool heater or irrigation system can be located outside of the structure 32.

The depicted structure 32 includes a plurality of rooms 38, separated at least partly from each other via walls 40. The walls 40 can include interior walls or exterior walls. Each room can further include a floor 42 and a ceiling 44. Devices 10 can be mounted on, integrated with and/or supported by a wall 40, floor 42, or ceiling 44.

In some embodiments, the smart-home environment 30 of FIG. 2 includes a plurality of devices 10, including intelligent, multi-sensing, network-connected devices, that can integrate seamlessly with each other and/or with a central server or a cloud-computing system to provide any of a variety of useful smart-home objectives. The smart-home environment 30 may include one or more intelligent, multi-sensing, network-connected thermostats 46 (hereinafter referred to as "smart thermostats 46"), one or more intelligent, network-connected, multi-sensing hazard detection units 50 (hereinafter referred to as "smart hazard detectors 50"), one or more intelligent, multi-sensing, network-connected entryway interface devices 52 (hereinafter referred to as "smart doorbells 52"), and one or more intelligent, multi-sensing, network-connected video cameras 53 (hereinafter referred to as "smart video cameras 53"). According to embodiments, the smart thermostat 46 may include a Nest® Learning Thermostat—1st Generation T100577 or Nest® Learning Thermostat—2nd Generation T200577 by Nest Labs, Inc., among others. The smart thermostat 46 detects ambient climate characteristics (e.g., temperature and/or humidity) and controls a HVAC system 48 accordingly. The smart hazard detector 50 may detect the presence of a hazardous substance or a substance indicative of a hazardous substance (e.g., smoke, fire, or carbon monoxide). The smart doorbell 52 may detect a person's approach to or departure from a location (e.g., an outer door), control doorbell functionality, announce a person's approach or departure via audio or visual means, or control settings on a security system (e.g., to activate or deactivate the security system when occupants go and come).

The smart video camera 53 may be located inside or outside of the structure 32, as depicted. The smart video camera 53 may be wireless (e.g., Wifi) and/or wired and configured to communicate with one or more devices 10 in the smart home environment 30. Also, the smart video camera 53 may be configured to buffer video and record and send video to user devices 66 via the Internet and/or Nest® cloud service 64. Additionally, a software application may be installed on user devices 66 that is configured to access a live feed of the smart video camera 53 so that a user may view current footage. The smart video camera 53 may include a microphone and a speaker in order to enable two-way talk between the camera 53 and a user of the application. Further, the smart video camera 53 may be battery-powered or hard-wired and include infrared LEDs that enable night-vision. In addition, the smart video camera 53 may be configured to provide alerts to a subscribed or interested user of newly recorded available footage (e.g., configurable detected activities). For example, an outdoor smart video camera 53 may communicate with the smart doorbell 52 so that any time the doorbell 52 is rung and the user is not home, the camera 53 may send the video data a configurable amount of time before the doorbell 52 was rung and a configurable amount of time after the doorbell was rung 52 to the user. In this way, the user may determine who visited the home while they are away.

In some embodiments, the smart-home environment 30 of FIG. 2 further includes one or more intelligent, multi-sensing, network-connected wall switches 54 (hereinafter referred to as "smart wall switches 54"), along with one or more intelligent, multi-sensing, network-connected wall plug interfaces 56 (hereinafter referred to as "smart wall plugs 56"). The smart wall switches 54 may detect ambient lighting conditions, detect room-occupancy states, and control a power and/or dim state of one or more lights. In some instances, smart wall switches 54 may also control a power state or speed of a fan, such as a ceiling fan. The smart wall plugs 56 may detect occupancy of a room or enclosure and control supply of power to one or more wall plugs (e.g., such that power is not supplied to the plug if nobody is at home).

Still further, in some embodiments, the device 10 within the smart-home environment 30 may further include a plurality of intelligent, multi-sensing, network-connected appliances 58 (hereinafter referred to as "smart appliances 58"), such as refrigerators, stoves and/or ovens, televisions, washers, dryers, lights, stereos, intercom systems, garage-door openers, floor fans, ceiling fans, wall air conditioners, pool heaters, irrigation systems, security systems, and so forth. According to embodiments, the network-connected appliances 58 are made compatible with the smart-home environment 30 by cooperating with the respective manufacturers of the appliances. For example, the appliances 58 can be space heaters, window AC units, motorized duct vents, etc. When plugged in, an appliance 58 can announce itself to the smart-home network, such as by indicating what type of appliance 58 it is, and it can automatically integrate with the controls of the smart-home. Such communication by the appliance 58 to the smart home can be facilitated by any wired or wireless communication protocols known by those having ordinary skill in the art. The smart home also can include a variety of non-communicating legacy appliances 68, such as old conventional washer/dryers, refrigerators, and the like which can be controlled, albeit coarsely (ON/OFF), by virtue of the smart wall plugs 56. The smart-home environment 30 can further include a variety of partially communicating legacy appliances 70, such as infrared ("IR") controlled wall air conditioners or other IR-controlled devices, which can be controlled by IR signals provided by the smart hazard detectors 50 or the smart wall switches 54.

According to embodiments, the smart thermostats 46, the smart hazard detectors 50, the smart doorbells 52, the smart wall switches 54, the smart wall plugs 56, and other devices of the smart-home environment 30 are modular and can be incorporated into older and newer houses. For example, the devices 10 are designed around a modular platform consisting of two basic components: a head unit and a back plate, which is also referred to as a docking station. Multiple configurations of the docking station are provided so as to be compatible with any home, such as older and newer homes. However, all of the docking stations include a standard head-connection arrangement, such that any head unit can be removably attached to any docking station. Thus, in some embodiments, the docking stations are interfaces that serve as physical connections to the structure and the voltage wiring of the homes, and the interchangeable head units contain all of the sensors 12, processors 28, user interfaces 14, the power supply 16, the network interface 18, and other functional components of the devices 10 described above.

Many different commercial and functional possibilities for provisioning, maintenance, and upgrade are possible. For example, after years of using any particular head unit, a user will be able to buy a new version of the head unit and simply plug it into the old docking station. There are also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, etc. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

The smart-home environment 30 may also include communication with devices 10 outside of the physical home but within a proximate geographical range of the home. For example, the smart-home environment 30 may include a pool heater monitor 34 that communicates a current pool temperature to other devices 10 within the smart-home environment 30 or receives commands for controlling the pool temperature. Similarly, the smart-home environment 30 may include an irrigation monitor 36 that communicates information regarding irrigation systems within the smart-home environment 30 and/or receives control information for controlling such irrigation systems. According to embodiments, an algorithm is provided for considering the geographic location of the smart-home environment 30, such as based on the zip code or geographic coordinates of the home. The geographic information is then used to obtain data helpful for determining optimal times for watering, such data may include sun location information, temperature, dewpoint, soil type of the land on which the home is located, etc.

By virtue of network connectivity, one or more of the smart-home devices 10 of FIG. 2 can further allow a user to interact with the device 10 even if the user is not proximate to the device 10. For example, a user can communicate with a device 10 using a computer (e.g., a desktop computer, laptop computer, or tablet) or other portable electronic device (e.g., a smartphone) 66. A webpage or app can be configured to receive communications from the user and control the device 10 based on the communications and/or to present information about the device's operation to the user. For example, the user can view a current setpoint temperature for a device 10 and adjust it using a computer. The user can be in the structure 32 during this remote communication or outside the structure 32.

As discussed, users can control the smart thermostat 46 and other smart devices 10 in the smart-home environment 30 using a network-connected computer or portable electronic device 66. In some examples, some or all of the occupants (e.g., individuals who live in the home) can register their device 66 with the smart-home environment 30. Such registration can be made at a central server to authenticate the occupant and/or the device 66 as being associated with the home and to give permission to the occupant to use the device 66 to control the smart devices 10 in the home. An occupant can use their registered device 66 to remotely control the smart devices 10 of the home, such as when the occupant is at work or on vacation. The occupant may also use their registered device 66 to control the smart devices 10 when the occupant is actually located inside the home, such as when the occupant is sitting on a couch inside the home. It should be appreciated that instead of or in addition to registering devices 66, the smart-home environment 30 makes inferences about which individuals live in the home and are therefore occupants and which devices 66 are associated with those individuals. As such, the smart-home environment 30 "learns" who is an occupant and permits the devices 66 associated with those individuals to control the smart devices 10 of the home.

In some instances, guests desire to control the smart devices. For example, the smart-home environment may receive communication from an unregistered mobile device of an individual inside the home, where said individual is not recognized as an occupant of the home. Further, for example, a smart-home environment may receive communication from a mobile device of an individual who is known to be or who is registered as a guest.

According to embodiments, a guest-layer of controls can be provided to guests of the smart-home environment 30. The guest-layer of controls gives guests access to basic controls (e.g., a judicially selected subset of features of the smart devices 10), such as temperature adjustments, but it locks out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices 10. For example, the guest layer of controls will not permit the guest to adjust the heat-pump lockout temperature.

A use case example of this is when a guest is in a smart home, the guest could walk up to the thermostat 46 and turn the dial manually, but the guest may not want to walk around the house "hunting" for the thermostat 46, especially at night while the home is dark and others are sleeping. Further, the guest may not want to go through the hassle of downloading the necessary application to their device for remotely controlling the thermostat 46. In fact, the guest may not have the home owner's login credentials, etc., and therefore cannot remotely control the thermostat 46 via such an application. Accordingly, according to embodiments of the invention, the guest can open a mobile browser on their mobile device, type a keyword, such as "NEST" into the URL field and tap "Go" or "Search", etc. In response, the device presents the guest with a user interface which allows the guest to move the target temperature between a limited range, such as 65 and 80 degrees Fahrenheit. As discussed, the user interface provides a guest layer of controls that are limited to basic functions. The guest cannot change the target humidity, modes, or view energy history.

According to embodiments, to enable guests to access the user interface that provides the guest layer of controls, a local webserver is provided that is accessible in the local area network (LAN). It does not require a password, because physical presence inside the home is established reliably enough by the guest's presence on the LAN. In some embodiments, during installation of the smart device 10, such as the smart thermostat 46, the home owner is asked if they want to enable a Local Web App (LWA) on the smart device 10. Business owners will likely say no; home owners will likely say yes. When the LWA option is selected, the smart device 10 broadcasts to the LAN that the above referenced keyword, such as "NEST", is now a host alias for its local web server. Thus, no matter whose home a guest goes to, that same keyword (e.g., "NEST") is always the URL you use to access the LWA, provided the smart device 10 is purchased from the same manufacturer. Further, according to embodiments, if there is more than one smart device 10 on the LAN, the second and subsequent smart devices 10 do not offer to set up another LWA. Instead, they register themselves as target candidates with the master LWA. And in this case the LWA user would be asked which smart device 10 they want to change the temperature on before getting the simplified user interface for the particular smart device 10 they choose.

According to embodiments, a guest layer of controls may also be provided to users by means other than a device 66. For example, the smart device 10, such as the smart thermostat 46, may be equipped with walkup-identification technology (e.g., face recognition, RFID, ultrasonic sensors) that "fingerprints" or creates a "signature" for the occupants of the home. The walkup-identification technology can be the same as or similar to the fingerprinting and signature creating techniques descripted in other sections of this application. In operation, when a person who does not live in the home or is otherwise not registered with the smart home or whose fingerprint or signature is not recognized by the smart home "walks up" to a smart device 10, the smart device 10 provides the guest with the guest layer of controls, rather than full controls.

As described below, the smart thermostat 46 and other smart devices 10 "learn" by observing occupant behavior. For example, the smart thermostat 46 learns occupants' preferred temperature set-points for mornings and evenings, and it learns when the occupants are asleep or awake, as well as when the occupants are typically away or at home, for example. According to embodiments, when a guest controls the smart devices 10, such as the smart thermostat 46, the smart devices 10 do not "learn" from the guest. This prevents the guest's adjustments and controls from affecting the learned preferences of the occupants.

According to some embodiments, a smart television remote control 67 is provided. The smart remote control 67 recognizes occupants by thumbprint, visual identification, RFID, etc., and it recognizes a user as a guest or as someone belonging to a particular class having limited control and access (e.g., child). Upon recognizing the user as a guest or someone belonging to a limited class, the smart remote control 67 only permits that user to view a subset of channels and to make limited adjustments to the settings of the television and other devices. For example, a guest cannot adjust the digital video recorder (DVR) settings, and a child is limited to viewing child-appropriate programming.

According to some embodiments, similar controls are provided for other instruments, utilities, and devices 10 in the house. For example, sinks, bathtubs, and showers can be controlled by smart spigots that recognize users as guests or as children and therefore prevent water from exceeding a designated temperature that is considered safe.

In some embodiments, in addition to containing processing and sensing capabilities, each of the devices 34, 36, 46, 50, 52, 54, 56, and 58 (collectively referred to as "the smart devices 10") is capable of data communications and information sharing with any other of the smart devices 10, as well as to any central server or cloud-computing system or any other device that is network-connected anywhere in the world. The required data communications can be carried out using any of a variety of custom or standard wireless protocols (Wi-Fi, ZigBee, 6LoWPAN, etc.) and/or any of a variety of custom or standard wired protocols (CAT6 Ethernet, HomePlug, etc.)

According to embodiments, all or some of the smart devices 10 can serve as wireless or wired repeaters. For example, a first one of the smart devices 10 can communicate with a second one of the smart device 10 via a wireless router 60. The smart devices 10 can further communicate with each other via a connection to a network, such as the Internet 62. Through the Internet 62, the smart devices 10 can communicate with a central server or a cloud-computing system 64. The central server or cloud-computing system 64 can be associated with a manufacturer, support entity, or service provider associated with the device 10. For one embodiment, a user may be able to contact customer support using a device itself rather than needing to use other communication means such as a telephone or Internet-connected computer. Further, software updates can be automatically sent from the central server or cloud-computing system 64 to devices (e.g., when available, when purchased, or at routine intervals).

According to embodiments, the smart devices 10 combine to create a mesh network of spokesman and low-power nodes in the smart-home environment 30, where some of the smart devices 10 are "spokesman" nodes and others are "low-powered" nodes. Some of the smart devices 10 in the smart-home environment 30 are battery powered, while others have a regular and reliable power source, such as by connecting to wiring (e.g., to 120V line voltage wires) behind the walls 40 of the smart-home environment 30. The smart devices 10 that have a regular and reliable power source are referred to as "spokesman" nodes. These nodes are equipped with the capability of using any wireless protocol or manner to facilitate bidirectional communication with any of a variety of other devices 10 in the smart-home environment 30 as well as with the central server or cloud-computing system 64. On the other hand, the devices 10 that are battery powered are referred to as "low-power" nodes. These nodes tend to be smaller than spokesman nodes and can only communicate using wireless protocols that requires very little power, such as Zigbee, 6LoWPAN, etc. Further, some, but not all, low-power nodes are incapable of bidirectional communication. These low-power nodes send messages, but they are unable to "listen". Thus, other devices 10 in the smart-home environment 30, such as the spokesman nodes, cannot send information to these low-power nodes.

As described, the smart devices 10 serve as low-power and spokesman nodes to create a mesh network in the smart-home environment 30. Individual low-power nodes in the smart-home environment 30 regularly send out messages regarding what they are sensing, and the other low-powered nodes in the smart-home environment 30—in addition to sending out their own messages—repeat the messages, thereby causing the messages to travel from node to node (i.e., device 10 to device 10) throughout the smart-home environment 30. The spokesman nodes in the smart-home environment 30 are able to "drop down" to low-powered communication protocols to receive these messages, translate the messages to other communication protocols, and send the translated messages to other spokesman nodes and/or the central server or cloud-computing system 64. Thus, the low-powered nodes using low-power communication protocols are able send messages across the entire smart-home environment 30 as well as over the Internet 62 to the central server or cloud-computing system 64. According to embodiments, the mesh network enables the central server or cloud-computing system 64 to regularly receive data from all of the smart devices 10 in the home, make inferences based on the data, and send commands back to one of the smart devices 10 to accomplish some of the smart-home objectives described herein.

As described, the spokesman nodes and some of the low-powered nodes are capable of "listening". Accordingly, users, other devices, and the central server or cloud-computing system 64 can communicate controls to the low-powered nodes. For example, a user can use the portable electronic device (e.g., a smartphone) 66 to send commands over the Internet 62 to the central server or cloud-computing system 64, which then relays the commands to the spokesman nodes in the smart-home environment 30. The spokesman nodes drop down to a low-power protocol to communicate the commands to the low-power nodes throughout the smart-home environment 30, as well as to other spokesman nodes that did not receive the commands directly from the central server or cloud-computing system 64.

An example of a low-power node is a smart nightlight 65. In addition to housing a light source, the smart nightlight 65 houses an occupancy sensor, such as an ultrasonic or passive IR sensor, and an ambient light sensor, such as a photoresistor or a single-pixel sensor that measures light in the room. In some embodiments, the smart nightlight 65 is configured to activate the light source when its ambient light sensor detects that the room is dark and when its occupancy sensor detects that someone is in the room. In other embodiments, the smart nightlight 65 is simply configured to activate the light source when its ambient light sensor detects that the room is dark. Further, according to embodiments, the smart nightlight 65 includes a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device 10 to smart device 10) within the smart-home environment 30 as well as over the Internet 62 to the central server or cloud-computing system 64.

Other examples of low-powered nodes include battery-operated versions of the smart hazard detectors 50. These smart hazard detectors 50 are often located in an area without access to constant and reliable power and, as discussed in detail below, may include any number and type of sensors 12, such as smoke/fire/heat sensors, carbon monoxide/dioxide sensors, occupancy/motion sensors, ambient light sensors, temperature sensors, humidity sensors, and the like. Furthermore, smart hazard detectors 50 can send messages that correspond to each of the respective sensors 12 to the other devices 10 and the central server or cloud-computing system 64, such as by using the mesh network as described above.

Examples of spokesman nodes include smart thermostats 46, smart doorbells 52, smart wall switches 54, and smart wall plugs 56. These devices 46, 52, 54, and 56 are often located near and connected to a reliable power source, and therefore can include more power-consuming components, such as one or more communication chips capable of bidirectional communication in any variety of protocols.

In some embodiments, these low-powered and spokesman nodes (e.g., devices 46, 50, 52, 54, 56, 58, and 65) can function as "tripwires" for an alarm system in the smart-home environment 30. For example, in the event a perpetrator circumvents detection by alarm sensors located at windows, doors, and other entry points of the smart-home environment 30, the alarm could be triggered upon receiving an occupancy, motion, heat, sound, etc. message from one or more of the low-powered and spokesman nodes in the mesh network. For example, upon receiving a message from a smart nightlight 65 indicating the presence of a person, the central server or cloud-computing system 64 or some other device could trigger an alarm, provided the alarm is armed at the time of detection. Thus, the alarm system could be enhanced by various low-powered and spokesman nodes located throughout the smart-home environment 30. In this example, a user could enhance the security of the smart-home environment 30 by buying and installing extra smart nightlights 65. However, in a scenario where the perpetrator uses a radio transceiver to jam the wireless network, the devices 10 may be incapable of communicating with each other. Therefore, as discussed in detail below, the present techniques provide network communication jamming attack detection and notification solutions to such a problem.

In some embodiments, the mesh network can be used to automatically turn on and off lights as a person transitions from room to room. For example, the low-powered and spokesman nodes detect the person's movement through the smart-home environment 30 and communicate corresponding messages through the mesh network. Using the messages that indicate which rooms are occupied, the central server or cloud-computing system 64 or some other device 10 activates and deactivates the smart wall switches 54 to automatically provide light as the person moves from room to room in the smart-home environment 30. Further, users may provide pre-configuration information that indicates which smart wall plugs 56 provide power to lamps and other light sources, such as the smart nightlight 65. Alternatively, this mapping of light sources to wall plugs 56 can be done automatically (e.g., the smart wall plugs 56 detect when a light source is plugged into it, and it sends a corresponding message to the central server or cloud-computing system 64). Using this mapping information in combination with messages that indicate which rooms are occupied, the central server or cloud-computing system 64 or some other device activates and deactivates the smart wall plugs 56 that provide power to lamps and other light sources so as to track the person's movement and provide light as the person moves from room to room.

In some embodiments, the mesh network of low-powered and spokesman nodes can be used to provide exit lighting in the event of an emergency. In some instances, to facilitate this, users provide pre-configuration information that indicates exit routes in the smart-home environment 30. For example, for each room in the house, the user provides a map of the best exit route. It should be appreciated that instead of a user providing this information, the central server or cloud-computing system 64 or some other device 10 could automatically determine the routes using uploaded maps, diagrams, architectural drawings of the smart-home house, as well as using a map generated based on positional information obtained from the nodes of the mesh network (e.g., positional information from the devices 10 is used to construct a map of the house). In operation, when an alarm is activated (e.g., when one or more of the smart hazard detector 50 detects smoke and activates an alarm), the central server or cloud-computing system 64 or some other device 10 uses occupancy information obtained from the low-powered and spokesman nodes to determine which rooms are occupied and then turns on lights (e.g., nightlights 65, wall switches 54, wall plugs 56 that power lamps) along the exit routes from the occupied rooms so as to provide emergency exit lighting.

Further included and illustrated in the smart-home environment 30 of FIG. 2 are service robots 69 each configured to carry out, in an autonomous manner, any of a variety of household tasks. For some embodiments, the service robots 69 can be respectively configured to perform floor sweeping, floor washing, etc. in a manner similar to that of known commercially available devices such as the ROOMBA™ and SCOOBA™ products sold by iRobot, Inc. of Bedford, Mass. Tasks such as floor sweeping and floor washing can be considered as "away" or "while-away" tasks for purposes of the instant description, as it is generally more desirable for these tasks to be performed when the occupants are not present. For other embodiments, one or more of the service robots 69 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

When serving as a localized thermostat for an occupant, a particular one of the service robots 69 can be considered to be facilitating what can be called a "personal comfort-area network" for the occupant, with the objective being to keep the occupant's immediate space at a comfortable temperature wherever that occupant may be located in the home. This can be contrasted with conventional wall-mounted room thermostats, which have the more attenuated objective of keeping a statically-defined structural space at a comfortable temperature. According to one embodiment, the localized-thermostat service robot 69 is configured to move itself into the immediate presence (e.g., within five feet) of a particular occupant who has settled into a particular location in the home (e.g. in the dining room to eat their breakfast and read the news). The localized-thermostat service robot 69 includes a temperature sensor 12, a processor 28, and wireless communication components configured such that control communications with the HVAC system, either directly or through a wall-mounted wirelessly communicating thermostat coupled to the HVAC system, are maintained and such that the temperature in the immediate vicinity of the occupant is maintained at their desired level. If the occupant then moves and settles into another location (e.g. to the living room couch to watch television), the localized-thermostat service robot 69 proceeds to move and park itself next to the couch and keep that particular immediate space at a comfortable temperature.

Technologies by which the localized-thermostat service robot 69 (and/or the larger smart-home system of FIG. 2) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile).

When serving as a localized air monitor/purifier for an occupant, a particular service robot 69 can be considered to be facilitating what can be called a "personal health-area network" for the occupant, with the objective being to keep the air quality in the occupant's immediate space at healthy levels. Alternatively or in conjunction therewith, other health-related functions can be provided, such as monitoring the temperature or heart rate of the occupant (e.g., using finely remote sensors, near-field communication with on-person monitors, etc.). When serving as a localized hazard detector for an occupant, a particular service robot 69 can be considered to be facilitating what can be called a "personal safety-area network" for the occupant, with the objective being to ensure there is no excessive carbon monoxide, smoke, fire, etc., in the immediate space of the occupant. Methods analogous to those described above for personal comfort-area networks in terms of occupant identifying and tracking are likewise applicable for personal health-area network and personal safety-area network embodiments.

According to some embodiments, the above-referenced facilitation of personal comfort-area networks, personal health-area networks, personal safety-area networks, and/or other such human-facing functionalities of the service robots 69, are further enhanced by logical integration with other smart sensors in the home according to rules-based inferencing techniques or artificial intelligence techniques for achieving better performance of those human-facing functionalities and/or for achieving those goals in energy-conserving or other resource-conserving ways. Thus, for one embodiment relating to personal health-area networks, the air monitor/purifier service robot 69 can be configured to detect whether a household pet is moving toward the currently settled location of the occupant (e.g., using on-board sensors and/or by data communications with other smart-home sensors along with rules-based inferencing/artificial intelligence techniques), and if so, the air purifying rate is immediately increased in preparation for the arrival of more airborne pet dander. For another embodiment relating to personal safety-area networks, the hazard detector service robot 69 can be advised by other smart-home sensors that the temperature and humidity levels are rising in the kitchen, which is nearby to the occupant's current dining room location, and responsive to this advisory the hazard detector service robot 69 will temporarily raise a hazard detection threshold, such as a smoke detection threshold, under an inference that any small increases in ambient smoke levels will most likely be due to cooking activity and not due to a genuinely hazardous condition.

The above-described "human-facing" and "away" functionalities can be provided, without limitation, by multiple distinct service robots 69 having respective dedicated ones of such functionalities, by a single service robot 69 having an integration of two or more different ones of such functionalities, and/or any combinations thereof (including the ability for a single service robot 69 to have both "away" and "human facing" functionalities) without departing from the scope of the present teachings. Electrical power can be provided by virtue of rechargeable batteries or other rechargeable methods, such as an out-of-the-way docking station to which the service robots 69 will automatically dock and recharge its batteries (if needed) during periods of inactivity. Preferably, each service robot 69 includes wireless communication components that facilitate data communications with one or more of the other wirelessly communicating smart-home sensors of FIG. 2 and/or with one or more other service robots 69 (e.g., using Wi-Fi, Zigbee, Z-Wave, 6LoWPAN, etc.), and one or more of the smart-home devices 10 can be in communication with a remote server over the Internet 62. Alternatively or in conjunction therewith, each service robot 69 can be configured to communicate directly with a remote server by virtue of cellular telephone communications, satellite communications, 3G/4G network data communications, or other direct communication method.

Provided according to some embodiments are systems and methods relating to the integration of the service robot(s) 69 with home security sensors and related functionalities of the smart home system. The embodiments are particularly applicable and advantageous when applied for those service robots 69 that perform "away" functionalities or that otherwise are desirable to be active when the home is unoccupied (hereinafter "away-service robots 69"). Included in the embodiments are methods and systems for ensuring that home security systems, intrusion detection systems, and/or occupancy-sensitive environmental control systems (for example, occupancy-sensitive automated set-back thermostats that enter into a lower-energy-using condition when the home is unoccupied) are not erroneously triggered by the away-service robots 69.

Provided according to one embodiment is a home automation and security system (e.g., as shown in FIG. 2) that is remotely monitored by a monitoring service by virtue of automated systems (e.g., cloud-based servers or other central servers 64, hereinafter "central server 64") that are in data communications with one or more network-connected elements of the home automation and security system. The away-service robots 69 are configured to be in operative data communication with the central server 64, and are configured such that they remain in a non-away-service state (e.g., a dormant state at their docking station) unless permission is granted from the central server 64 (e.g., by virtue of an "away-service-OK" message from the central server) to commence their away-service activities. An away-state determination made by the system, which can be arrived at (i) exclusively by local on-premises smart device(s) 10 based on occupancy sensor data, (ii) exclusively by the central server 64 based on received occupancy sensor data and/or based on received proximity-related information such as GPS coordinates from user smartphones or automobiles, or (iii) any combination of (i) and (ii) can then trigger the granting of away-service permission to the away-service robots 69 by the central server 64. During the course of the away-service robot 69 activity, during which the away-service robots 69 may continuously detect and send their in-home location coordinates to the central server 64, the central server 64 can readily filter signals from the occupancy sensing devices to distinguish between the away-service robot 69 activity versus any unexpected intrusion activity, thereby avoiding a false intrusion alarm condition while also ensuring that the home is secure. Alternatively or in conjunction therewith, the central server 64 may provide filtering data (such as an expected occupancy-sensing profile triggered by the away-service robots 69) to the occupancy sensing nodes or associated processing nodes of the smart home, such that the filtering is performed at the local level. Although somewhat less secure, it would also be within the scope of the present teachings for the central server 64 to temporarily disable the occupancy sensing equipment for the duration of the away-service robot 69 activity.

According to another embodiment, functionality similar to that of the central server 64 in the above example can be performed by an on-site computing device such as a dedicated server computer, a "master" home automation console or panel, or as an adjunct function of one or more of the smart-home devices 10 of FIG. 2. In such an embodiment, there would be no dependency on a remote service provider to provide the "away-service-OK" permission to the away-service robots 69 and the false-alarm-avoidance filtering service or filter information for the sensed intrusion detection signals.

According to other embodiments, there are provided methods and systems for implementing away-service robot 69 functionality while avoiding false home security alarms and false occupancy-sensitive environmental controls without the requirement of a single overall event orchestrator. For purposes of the simplicity in the present disclosure, the home security systems and/or occupancy-sensitive environmental controls that would be triggered by the motion, noise, vibrations, or other disturbances of the away-service robot 69 activity are referenced simply as "activity sensing systems," and when so triggered will yield a "disturbance-detected" outcome representative of the false trigger (for example, an alarm message to a security service, or an "arrival" determination for an automated setback thermostat that causes the home to be heated or cooled to a more comfortable "occupied" setpoint temperature). According to one embodiment, the away-service robots 69 are configured to emit a standard ultrasonic sound throughout the course of their away-service activity, the activity sensing systems are configured to detect that standard ultrasonic sound, and the activity sensing systems are further configured such that no disturbance-detected outcome will occur for as long as that standard ultrasonic sound is detected. For other embodiments, the away-service robots 69 are configured to emit a standard notification signal throughout the course of their away-service activity, the activity sensing systems are configured to detect that standard notification signal, and the activity sensing systems are further configured such that no disturbance-detected outcome will occur for as long as that standard notification signal is detected, wherein the standard notification signal comprises one or more of: an optical notifying signal; an audible notifying signal; an infrared notifying signal; an infrasonic notifying signal; a wirelessly transmitted data notification signal (e.g., an IP broadcast, multicast, or unicast notification signal, or a notification message sent in an TCP/IP two-way communication session).

According to some embodiments, the notification signals sent by the away-service robots 69 to the activity sensing systems are authenticated and encrypted such that the notifications cannot be learned and replicated by a potential burglar. Any of a variety of known encryption/authentication schemes can be used to ensure such data security including, but not limited to, methods involving third party data security services or certificate authorities. For some embodiments, a permission request-response model can be used, wherein any particular away-service robot 69 requests permission from each activity sensing system in the home when it is ready to perform its away-service tasks, and does not initiate such activity until receiving a "yes" or "permission granted" message from each activity sensing system (or from a single activity sensing system serving as a "spokesman" for all of the activity sensing systems). One advantage of the described embodiments that do not require a central event orchestrator is that there can (optionally) be more of an arms-length relationship between the supplier(s) of the home security/environmental control equipment, on the one hand, and the supplier(s) of the away-service robot(s) 69, on the other hand, as it is only required that there is the described standard one-way notification protocol or the described standard two-way request/permission protocol to be agreed upon by the respective suppliers.

According to still other embodiments, the activity sensing systems are configured to detect sounds, vibrations, RF emissions, or other detectable environmental signals or "signatures" that are intrinsically associated with the away-service activity of each away-service robot 69, and are further configured such that no disturbance-detected outcome will occur for as long as that particular detectable signal or environmental "signature" is detected. By way of example, a particular kind of vacuum-cleaning away-service robot 69 may emit a specific sound or RF signature. For one embodiment, the away-service environmental signatures for each of a plurality of known away-service robots 69 are stored in the memory of the activity sensing systems based on empirically collected data, the environmental signatures being supplied with the activity sensing systems and periodically updated by a remote update server. For another embodiment, the activity sensing systems can be placed into a "training mode" for the particular home in which they are installed, wherein they "listen" and "learn" the particular environmental signatures of the away-service robots 69 for that home during that training session, and thereafter will suppress disturbance-detected outcomes for intervals in which those environmental signatures are heard.

For still another embodiment, which is particularly useful when the activity sensing system is associated with occupancy-sensitive environmental control equipment rather than a home security system, the activity sensing system is configured to automatically learn the environmental signatures for the away-service robots 69 by virtue of automatically performing correlations over time between detected environmental signatures and detected occupancy activity. By way of example, for one embodiment an intelligent automated nonoccupancy-triggered setback thermostat such as the Nest Learning Thermostat can be configured to constantly monitor for audible and RF activity as well as to perform infrared-based occupancy detection. In particular view of the fact that the environmental signature of the away-service robot 69 will remain relatively constant from event to event, and in view of the fact that the away-service events will likely either (a) themselves be triggered by some sort of nonoccupancy condition as measured by the away-service robots 69 themselves, or (b) occur at regular times of day, there will be patterns in the collected data by which the events themselves will become apparent and for which the environmental signatures can be readily learned. Generally speaking, for this automatic-learning embodiment in which the environmental signatures of the away-service robots 69 are automatically learned without requiring user interaction, it is more preferable that a certain number of false triggers be tolerable over the course of the learning process. Accordingly, this automatic-learning embodiment is more preferable for application in occupancy-sensitive environmental control equipment (such as an automated setback thermostat) rather than home security systems for the reason that a few false occupancy determinations may cause a few instances of unnecessary heating or cooling, but will not otherwise have any serious consequences, whereas false home security alarms may have more serious consequences.

According to embodiments, technologies including the sensors 12 of the smart devices 10 located in the mesh network of the smart-home environment 30 in combination with rules-based inference engines or artificial intelligence provided at the central server or cloud-computing system 64 are used to provide a personal "smart alarm clock" for individual occupants of the home. For example, user-occupants can communicate with the central server or cloud-computing system 64 via their mobile devices 66 to access an interface for the smart alarm clock. There, occupants can turn on their "smart alarm clock" and input a wake time for the next day and/or for additional days. In some embodiments, the occupant may have the option of setting a specific wake time for each day of the week, as well as the option of setting some or all of the inputted wake times to "repeat". Artificial intelligence will be used to consider the occupant's response to these alarms when they go off and make inferences about the user's preferred sleep patterns over time.

According to embodiments, the smart device 10 in the smart-home environment 30 that happens to be closest to the occupant when the occupant falls asleep will be the device 10 that transmits messages regarding when the occupant stopped moving, from which the central server or cloud-computing system 64 will make inferences about where and when the occupant prefers to sleep. Also, the closest smart device 10 to the sleeping occupant may be the device 10 that sounds the alarm to wake the occupant. In this manner, the "smart alarm clock" will follow the occupant throughout the house, by tracking the individual occupants based on their "unique signature", which is determined based on data obtained from sensors 12 located in the smart devices 10. For example, the sensors 12 include ultrasonic sensors, passive IR sensors, and the like. The unique signature is based on a combination of walking gate, patterns of movement, voice, height, size, etc. It should be appreciated that facial recognition may also be used.

According to an embodiment, the wake times associated with the "smart alarm clock" are used by the smart thermostat 46 to control the HVAC in an efficient manner so as to pre-heat or cool the house to the occupant's desired "sleeping" and "awake" temperature settings. The preferred settings can be learned over time, such as by observing which temperature the occupant sets the thermostat 46 to before going to sleep and which temperature the occupant sets the thermostat 46 to upon waking up.

According to an embodiment, a device 10 is positioned proximate to the occupant's bed, such as on an adjacent nightstand, and collects data as the occupant sleeps using noise sensors, motion sensors (e.g., ultrasonic, IR, and optical), etc. Data may be obtained by the other smart devices 10 in the room as well. Such data may include the occupant's breathing patterns, heart rate, movement, etc. Inferences are made based on this data in combination with data that indicates when the occupant actually wakes up. For example, if—on a regular basis—the occupant's heart rate, breathing, and moving all increase by 5% to 10%, twenty to thirty minutes before the occupant wakes up each morning, then predictions can be made regarding when the occupant is going to wake. Other devices in the home can use these predictions to provide other smart-home objectives, such as adjusting the smart thermostat 46 so as to pre-heat or cool the home to the occupant's desired setting before the occupant wakes up. Further, these predictions can be used to set the "smart alarm clock" for the occupant, to turn on lights, etc.

According to embodiments, technologies including the sensors 12 of the smart devices 10 located throughout the smart-home environment 30 in combination with rules-based inference engines or artificial intelligence provided at the central server or cloud-computing system 64 are used to detect or monitor the progress of Alzheimer's Disease. For example, the unique signatures of the occupants are used to track the individual occupants' movement throughout the smart-home environment 30. This data can be aggregated and analyzed to identify patterns indicative of Alzheimer's. Oftentimes, individuals with Alzheimer's have distinctive patterns of migration in their homes. For example, a person will walk to the kitchen and stand there for a while, then to the living room and stand there for a while, and then back to the kitchen. This pattern will take about thirty minutes, and then the person will repeat the pattern. According to embodiments, the remote servers or cloud computing architectures 64 analyze the person's migration data collected by the mesh network of the smart-home environment 30 to identify such patterns.

In addition, another device 10 in the smart-home environment 30 may include a hub device 72, such as a Nest® hub device. In some embodiments, the hub device 72 may be an example of the "master" panel previously mentioned regarding the security system. The hub device 72 may communicate wirelessly over the wireless network provided by the router 60 with each of the other devices 10 in the smart-home environment 30 via separate channels. For example, the hub device 72 may monitor each device 10 to ensure it is active and communicating by pinging each device 10 over its individual channel. Further, the hub device 72 may communicate with remote servers such as Nest® servers 64, over the Internet via WiFi or its wired component 24 and/or over 3G via its cellular component 26. Additionally, the hub device 72 may communicate with cellular towers via its cellular component 26 as an alternative communication medium in case its wireless network is being subjected to a jamming attack. Thus, and as will be described in detail below, the hub device 72 provides robust mechanisms to detect wireless communication jamming attacks and notify the proper parties of the incident. As may be appreciated, employing such techniques greatly enhances the security a homeowner may experience and may deter crime.

Figure 3:
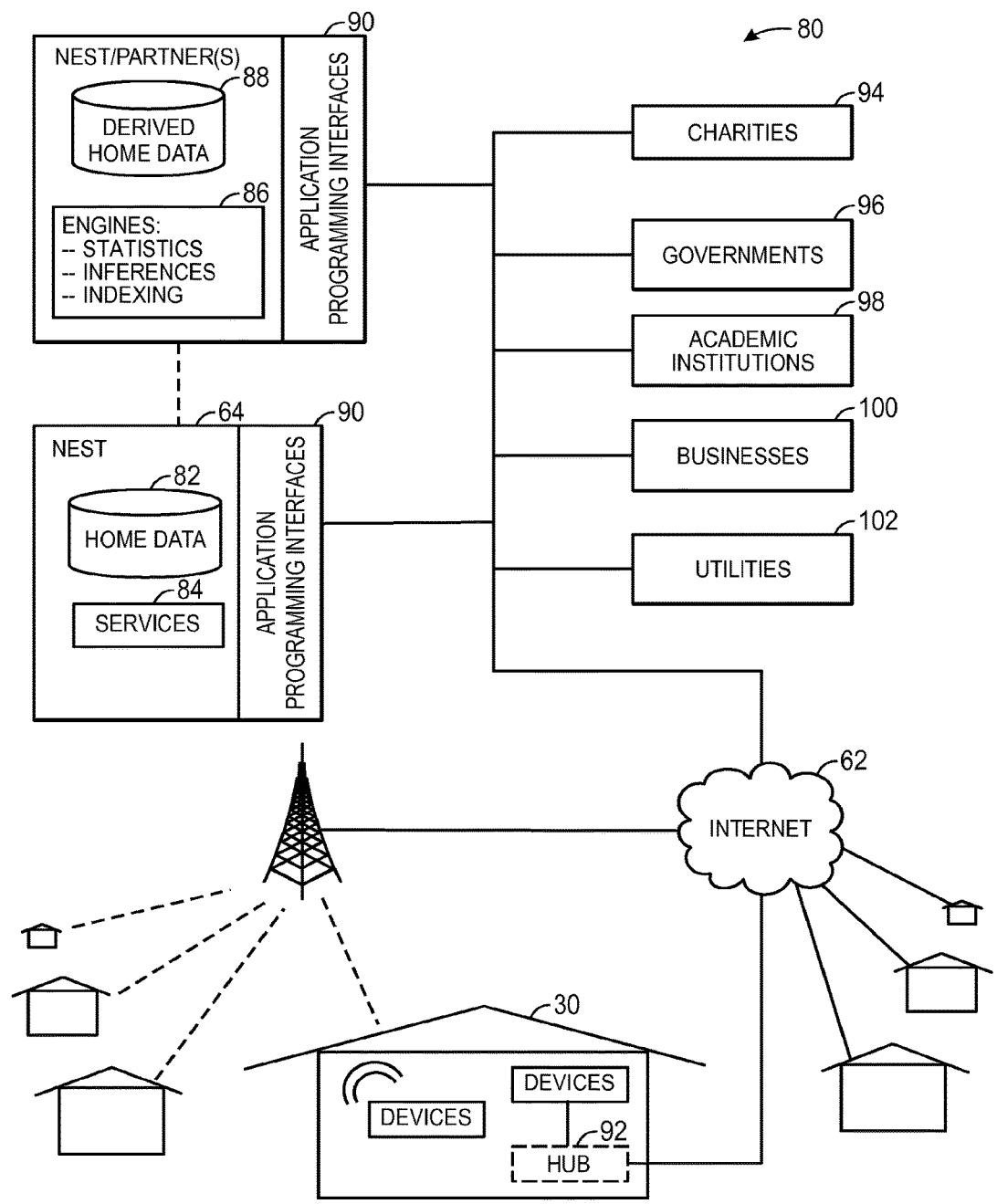
FIG. 3 illustrates a network-level view of an extensible devices and services platform with which the smart-home environment of FIG. 2 can be integrated, in accordance with an embodiment.

As illustrated in FIG. 3, an embodiment of the extensible devices and services platform 80 includes a processing engine 86, which can be concentrated at a single server or distributed among several different computing entities without limitation. The processing engine 86 can include engines configured to receive data from devices of smart-home environments 30 (e.g., via the Internet 62 or a hubbed network), to index the data, to analyze the data and/or to generate statistics based on the analysis or as part of the analysis. The analyzed data can be stored as derived home data 88.

Results of the analysis or statistics can thereafter be transmitted back to the device 10 that provided home data used to derive the results, to other devices 10, to a server providing a webpage to a user of the device 10, or to other non-device entities. For example, use statistics, use statistics relative to use of other devices 10, use patterns, and/or statistics summarizing sensor 12 readings can be generated by the processing engine 86 and transmitted. The results or statistics can be provided via the Internet 62. In this manner, the processing engine 86 can be configured and programmed to derive a variety of useful information from the home data 82. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engine 86 can generate statistics about device 10 usage across a population of devices 10 and send the statistics to device users, service providers or other entities (e.g., that have requested or may have provided monetary compensation for the statistics).

According to some embodiments, the home data 82, the derived home data 88, and/or another data can be used to create "automated neighborhood safety networks." For example, in the event the central server or cloud-computing architecture 64 receives data indicating that a particular home has been broken into, is experiencing a fire, or some other type of emergency event, an alarm is sent to other smart homes in the "neighborhood." In some instances, the central server or cloud-computing architecture 64 automatically identifies smart homes within a radius of the home experiencing the emergency and sends an alarm to the identified homes. In such instances, the other homes in the "neighborhood" do not have to sign up for or register to be a part of a safety network, but instead are notified of an emergency based on their proximity to the location of the emergency. This creates robust and evolving neighborhood security watch networks, such that if one person's home is getting broken into, an alarm can be sent to nearby homes, such as by audio announcements via the smart devices 10 located in those homes. It should be appreciated that this can be an opt-in service and that, in addition to or instead of the central server or cloud-computing architecture 64 selecting which homes to send alerts to, individuals can subscribe to participate in such networks and individuals can specify which homes they want to receive alerts from. This can include, for example, the homes of family members who live in different cities, such that individuals can receive alerts when their loved ones in other locations are experiencing an emergency.

According to some embodiments, sound, vibration, and/or motion sensing components of the smart devices 10 are used to detect sound, vibration, and/or motion created by running water. Based on the detected sound, vibration, and/or motion, the central server or cloud-computing architecture 64 makes inferences about water usage in the home and provides related services. For example, the central server or cloud-computing architecture 64 can run programs/algorithms that recognize what water sounds like and when it is running in the home. According to one embodiment, to map the various water sources of the home, upon detecting running water, the central server or cloud-computing architecture 64 sends a message to an occupant's mobile device asking if water is currently running or if water has been recently run in the home and, if so, which room and which water-consumption appliance (e.g., sink, shower, toilet, etc.) was the source of the water. This enables the central server or cloud-computing architecture 64 to determine the "signature" or "fingerprint" of each water source in the home. This is sometimes referred to herein as "audio fingerprinting water usage."

In one illustrative example, the central server or cloud-computing architecture 64 creates a signature for the toilet in the master bathroom, and whenever that toilet is flushed, the central server or cloud-computing architecture 64 will know that the water usage at that time is associated with that toilet. Thus, the central server or cloud-computing architecture 64 can track the water usage of that toilet as well as each water-consumption application in the home. This information can be correlated to water bills or smart water meters so as to provide users with a breakdown of their water usage.

According to some embodiments, sound, vibration, and/or motion sensing components of the smart devices 10 are used to detect sound, vibration, and/or motion created by mice and other rodents as well as by termites, cockroaches, and other insects (collectively referred to as "pests"). Based on the detected sound, vibration, and/or motion, the central server or cloud-computing architecture 64 makes inferences about pest-detection in the home and provides related services. For example, the central server or cloud-computing architecture 64 can run programs/algorithms that recognize what certain pests sound like, how they move, and/or the vibration they create, individually and/or collectively. According to one embodiment, the central server or cloud-computing architecture 64 can determine the "signatures" of particular types of pests.

For example, in the event the central server or cloud-computing architecture 64 detects sounds that may be associated with pests, it notifies the occupants of such sounds and suggests hiring a pest control company. If it is confirmed that pests are indeed present, the occupants input to the central server or cloud-computing architecture 64 confirms that its detection was correct, along with details regarding the identified pests, such as name, type, description, location, quantity, etc. This enables the central server or cloud-computing architecture 64 to "tune" itself for better detection and create "signatures" or "fingerprints" for specific types of pests. For example, the central server or cloud-computing architecture 64 can use the tuning as well as the signatures and fingerprints to detect pests in other homes, such as nearby homes that may be experiencing problems with the same pests. Further, for example, in the event that two or more homes in a "neighborhood" are experiencing problems with the same or similar types of pests, the central server or cloud-computing architecture 64 can make inferences that nearby homes may also have such problems or may be susceptible to having such problems, and it can send warning messages to those homes to help facilitate early detection and prevention.

In some embodiments, to encourage innovation and research and to increase products and services available to users, the devices and services platform 80 expose a range of application programming interfaces (APIs) 90 to third parties, such as charities 94, governmental entities 96 (e.g., the Food and Drug Administration or the Environmental Protection Agency), academic institutions 98 (e.g., university researchers), businesses 100 (e.g., providing device warranties or service to related equipment, targeting advertisements based on home data), utility companies 102, and other third parties. The APIs 90 are coupled to and permit third-party systems to communicate with the central server or the cloud-computing system 64, including the services 84, the processing engine 86, the home data 82, and the derived home data 88. For example, the APIs 90 allow applications executed by the third parties to initiate specific data processing tasks that are executed by the central server or the cloud-computing system 64, as well as to receive dynamic updates to the home data 82 and the derived home data 88.

For example, third parties can develop programs and/or applications, such as web or mobile apps, that integrate with the central server or the cloud-computing system 64 to provide services and information to users. Such programs and application may be, for example, designed to help users reduce energy consumption, to preemptively service faulty equipment, to prepare for high service demands, to track past service performance, etc., or to perform any of a variety of beneficial functions or tasks now known or hereinafter developed.

According to some embodiments, third-party applications make inferences from the home data 82 and the derived home data 88, such inferences may include when are occupants home, when are they sleeping, when are they cooking, when are they in the den watching television, and when do they shower. The answers to these questions may help third-parties benefit consumers by providing them with interesting information, products and services as well as with providing them with targeted advertisements.

In one example, a shipping company creates an application that makes inferences regarding when people are at home. The application uses the inferences to schedule deliveries for times when people will most likely be at home. The application can also build delivery routes around these scheduled times. This reduces the number of instances where the shipping company has to make multiple attempts to deliver packages, and it reduces the number of times consumers have to pick up their packages from the shipping company.

Figure 4:
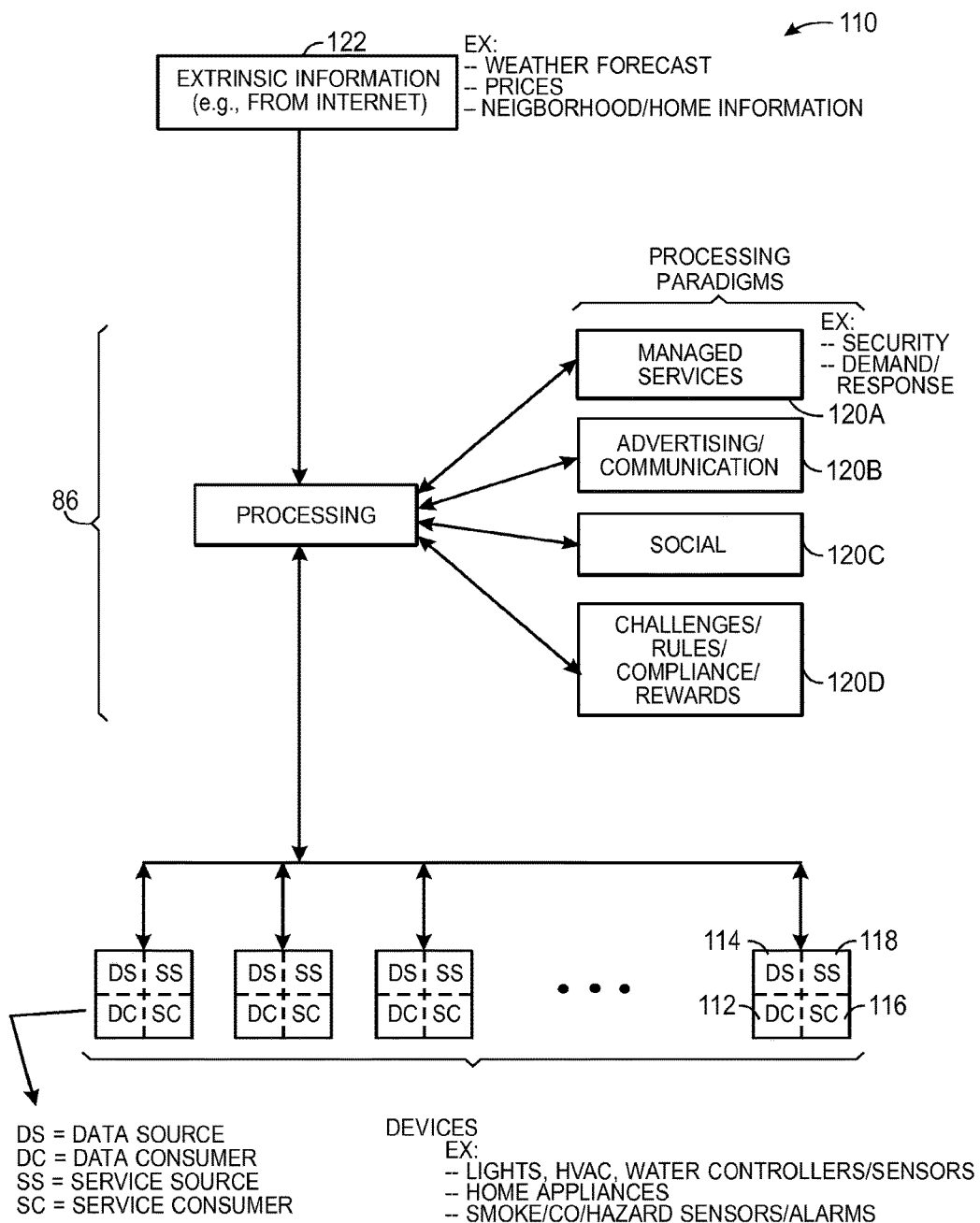
FIG. 4 illustrates an abstracted functional view of the extensible devices and services platform of FIG. 3, with reference to a processing engine as well as devices of the smart-home environment, in accordance with an embodiment.

To further illustrate, FIG. 4 describes an abstracted functional view 110 of the extensible devices and services platform 80 of FIG. 3, with particular reference to the processing engine 86 as well as devices, such as those of the smart-home environment 30 of FIG. 2. Even though devices 10 situated in smart-home environments 30 will have an endless variety of different individual capabilities and limitations, they can all be thought of as sharing common characteristics in that each of them is a data consumer 112 (DC), a data source 114 (DS), a services consumer 116 (SC), and a services source 118 (SS). Advantageously, in addition to providing the essential control information needed for the devices 10 to achieve their local and immediate objectives, the extensible devices and services platform 80 can also be configured to harness the large amount of data that is flowing out of these devices. In addition to enhancing or optimizing the actual operation of the devices 10 themselves with respect to their immediate functions, the extensible devices and services platform 80 can be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 86 as including a number of paradigms 120. Processing engine 86 can include a managed services paradigm 120a that monitors and manages primary or secondary device 10 functions. The device 10 functions can include ensuring proper operation of a device 10 given user inputs, estimating that (e.g., and responding to an instance in which) an intruder is or is attempting to be in a dwelling, detecting a failure of equipment coupled to the device 10 (e.g., a light bulb having burned out), implementing or otherwise responding to energy demand response events, or alerting a user of a current or predicted future event or characteristic. Processing engine 86 can further include an advertising/communication paradigm 120b that estimates characteristics (e.g., demographic information), desires and/or products of interest of a user based on device usage. Services, promotions, products or upgrades can then be offered or automatically provided to the user. Processing engine 86 can further include a social paradigm 120c that uses information from a social network, provides information to a social network (for example, based on device usage), and/or processes data associated with user and/or device 10 interactions with the social network platform. For example, a user's status as reported to their trusted contacts on the social network could be updated to indicate when they are home based on light detection, security system inactivation or device usage detectors. As another example, a user may be able to share device-usage statistics with other users. In yet another example, a user may share HVAC settings that result in low power bills and other users may download the HVAC settings to their smart thermostat 46 to reduce their power bills.

The processing engine 86 can include a challenges/rules/compliance/rewards paradigm 120d that informs a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc. For example, one challenge may involve participants turning down their thermostat 46 by one degree for one week. Those that successfully complete the challenge are rewarded, such as by coupons, virtual currency, status, etc. Regarding compliance, an example involves a rental-property owner making a rule that no renters are permitted to access certain owner's rooms. The devices 10 in the room having occupancy sensors could send updates to the owner when the room is accessed.

The processing engine 86 can integrate or otherwise utilize extrinsic information 122 from extrinsic sources to improve the functioning of one or more processing paradigms. Extrinsic information 122 can be used to interpret data received from a device 10, to determine a characteristic of the environment near the device 10 (e.g., outside a structure that the device is enclosed in), to determine services or products available to the user, to identify a social network or social-network information, to determine contact information of entities (e.g., public-service entities such as an emergency-response team, the police or a hospital) near the device 10, etc., to identify statistical or environmental conditions, trends or other information associated with a home or neighborhood, and so forth.

An extraordinary range and variety of benefits can be brought about by, and fit within the scope of, the described extensible devices and services platform 80, ranging from the ordinary to the profound. Thus, in one "ordinary" example, each bedroom of the smart-home environment 30 can be provided with a smart wall switch 54, a smart wall plug 56, and/or smart hazard detectors 50, all or some of which include an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform 80, there can be substantially more "profound" examples that can truly illustrate the potential of a larger "intelligence" that can be made available. By way of perhaps a more "profound" example, the same bedroom occupancy data that is being used for fire safety can also be "repurposed" by the processing engine 86 in the context of a social paradigm of neighborhood child development and education. Thus, for example, the same bedroom occupancy and motion data discussed in the "ordinary" example can be collected and made available (properly anonymized) for processing in which the sleep patterns of schoolchildren in a particular ZIP code can be identified and tracked. Localized variations in the sleeping patterns of the schoolchildren may be identified and correlated, for example, to different nutrition programs in local schools.

Detecting Wireless Jamming

As previously discussed, the described extensible devices and services platform 80 may enable communicating emergency information for smart-home environments 30 that are linked and/or to the proper authorities. For example, when a burglar breaks into a smart-home environment 30, a home security system may trip and sound an alarm and/or send emergency notifications to the neighbors, the police, the security company, and the like. However, in instances where the break in is preceded by a jamming attack on the wireless network, the notifications may not be sent out if their transmission is dependent upon the wireless network. Thus, another means to communicate with external parties may be desired. As such, some of the techniques disclosed herein may detect the jamming attack and send emergency notifications via side channels that are not dependent upon the wireless network being jammed.

Figure 5:
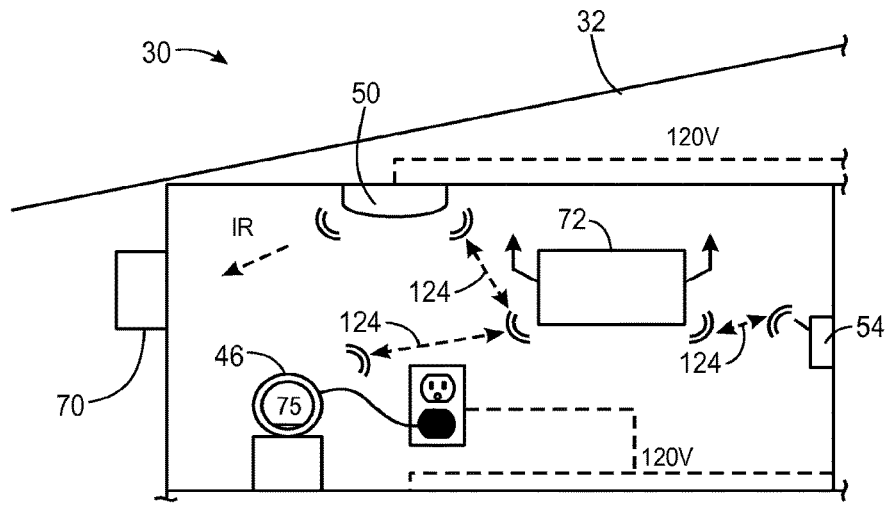
FIG. 5 illustrates a portion of a smart-home environment in which several devices of FIG. 1 may communicate with a hub device via the network layer protocol, in accordance with an embodiment.

To illustrate an example jamming attack, FIGS. 5-8 depict a smart-home network communicating normally, being attacked, detecting the jamming attack, and notifying the homeowner and/or authorities. It should be understood that the hub device 72 depicted may be any of the devices 10 described above (e.g., thermostat 46, hazard detector 50, video camera 53, etc.) or the hub device 72 may be a stand-alone device used for facilitating communication of alarms. As mentioned above, the hub device 72 may wirelessly communicate with each device 10 in the smart-home environment 30. Specifically, FIG. 5 illustrates a portion of a smart-home environment 30 in which the thermostat 46, the hazard detector 50, and the wall switch 54 are wirelessly communicating with the hub device 72 (represented by dashed lines 124). The devices 10 may be utilized as part of a home security system in that some or all of the devices 10 may include motion detectors (e.g., sensors 12), speakers 29, and the like for detecting occupancy. When the system is in an "away" mode (occupants are expected to be outside of the smart-home environment 30), the sensors 12 may be used to detect unwanted intrusions. If detected, an alarm may be triggered using the one or more speakers 29. In addition, the indoor and/or outdoor video cameras 53 previously discussed may also be a part of the home security system and the cameras 53 may trigger an alarm if an unexpected intruder is seen. The hub device 72 may be enabled to control the devices 10 it communicates with by turning them on or off, regulating power usage, providing operating instructions, and so forth. As such, the hub device 72 may acquire data from connected devices 10 to perform analysis and/or to transmit to remote servers 64 (e.g., Nest® servers). For example, the hub device 72 may acquire energy usage information from the wall switch 54 to determine when a homeowner typically uses the room and may determine to turn the wall switch 54 off when the homeowner typically is not using the room. This may be beneficial when a homeowner accidentally left the wall switch 54 on.

Also, the hub device 72 may wirelessly communicate with each device 10 over separate channels so that if any one channel is non-responsive, the hub device 72 may indicate to the user which specific device 10 is down. A channel may be unresponsive if the associated device's batteries are drained or fell out, the device 10 is malfunctioning, or the like. Further, as described in detail below with reference to FIG. 9, the hub device 72 may perform clear channel verification on each wirelessly connected devices' channel, and if a certain threshold number of devices' channels become incapacitated within a certain threshold period of time or are incapacitated for a certain threshold period of time, then the hub device 72 may determine that the wireless network is being jammed.

Figure 6:
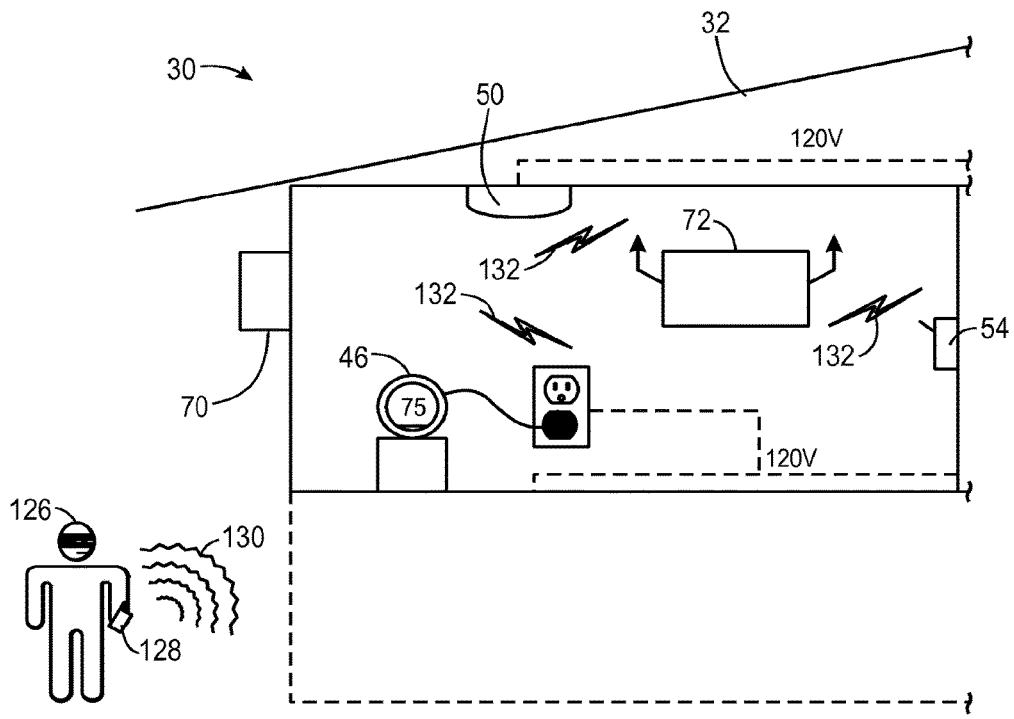
FIG. 6 illustrates a jamming attack disrupting wireless communications between several devices of FIG. 1 and the hub device, in accordance with an embodiment.

To continue the jamming attack example, FIG. 6 illustrates a criminal 126 with a radio transceiver 128 that has obtained access to the wireless network and is jamming the network by transmitting a malicious wireless signal 130 (represented by wavy lines). It should be noted that any device capable of performing a jamming attack on a wireless network may be utilized, and the disclosure is not limited to radio transceivers. As seen in FIG. 6, communications between the hub device 72 and the thermostat 46, the wall switch 54, and the hazard detector 50 are blocked by the malicious wireless signal 130 (represented by lightning bolts 132). Although only three devices 10 are shown as being jammed on the network, it should be understood that more or fewer devices 10 communicating over the wireless network within the smart-home environment 30 may be blocked by the radio transceiver 128. As such, the hub device 72 may occasionally determine whether it is being jammed. In one example, the hub device 72 may perform clear channel verification with each device 10 to determine whether each communication channel that the hub device 72 is using to communicate with the devices 10 is incapacitated. The hub device 72 thus may determine that the wireless network is being attacked. The various ways that wireless jamming attacks may be detected will be described in greater detail below.

Figure 7:
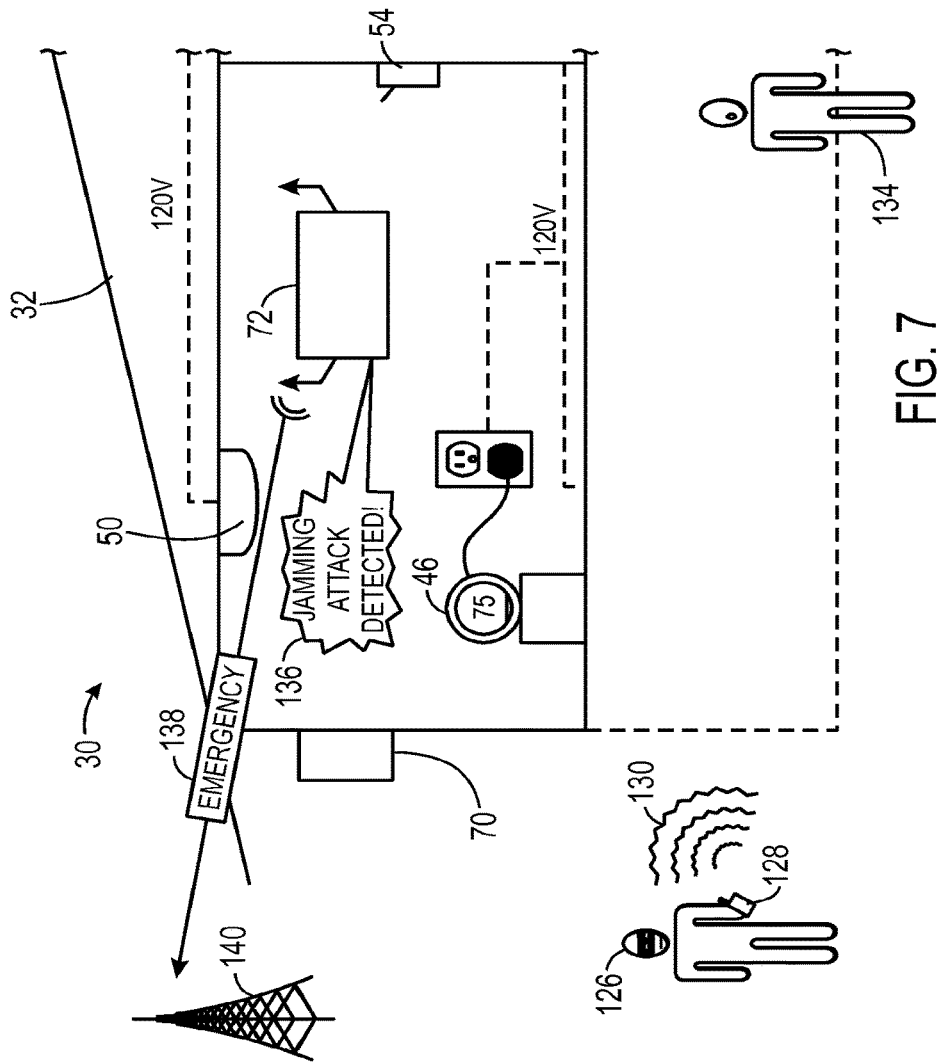
FIG. 7 illustrates the hub device detecting the jamming attack, announcing the detection in the smart-home environment via a speaker and/or communicating an emergency signal via a side channel, in accordance with an embodiment.

Thus, in FIG. 7, the hub device 72 has detected the wireless communication jamming attack and is notifying a homeowner 134 that a jamming attack is detected (represented by a dialogue bubble 136) via the speaker 29 of the hub device 72. Any suitable audio indication, such as words or sounds, may be emitted from the speaker 29 to indicate that a jamming attack has been detected. Further, in some embodiments, the speaker 29 may emit other audio signals, such as beeps or other audio communication signals, that can be detected by microphones of other electronic devices 10. In one example, a device 10 such as the router 60 may "hear" and decipher the audio signal to determine that the hub device 72 has detected a jamming attack. The hub device 72 may transmit an emergency signal to authorities (e.g., the police) via a side channel (e.g., a wired connection to the Internet 62). There may also be a hard-wired node (e.g., a video camera 53 hard-wired to the Internet via Ethernet) that includes a microphone that hears a verbal alarm or audio signal and deciphers whether a jamming attack is detected or not. If detected, the video camera 53 may transmit an emergency signal via its hard-wired Internet connection. Additionally or alternatively, a mobile cellular device (e.g., a cellular phone) belonging to the homeowner 134 may detect the audio signal in a similar manner as mentioned above. After detecting the emergency audio signal, the mobile cellular device belonging to the homeowner 134 may leverage its 3G/4G cellular network connection to send an emergency signal to the authorities if the home wireless network is blocked (and even if a wired connection to the Internet 62 is unavailable, such as if a fiber optic or coaxial cable connection to the house is cut).

Returning to the example of FIG. 7, as a result of the audio notification 136, the homeowner 134 may be startled and caught off guard, especially if the jamming attack occurs while the homeowner 134 is at home and asleep. However, after hearing the audio notification 136, the homeowner 134 may use a mobile device and/or other Internet 62 connected devices to call the police. Consequently, the detection and notification of the jamming attack may thwart a criminal plan to overwhelm the wireless network.

Additionally or alternatively, the hub device 72 may transmit an emergency signal 138 via a separate communication channel to the authorities and/or remote servers. For example, the hub device 72 may utilize the cellular component 26 to transmit the signal 88 to a cellular tower 140, since its ability to communicate via the local wireless network has been compromised. The emergency signal 138 may include certain data such as the desired party to send the signal, the address of the home where the attack is detected, the name of the homeowner, the time of the detection, a message (e.g., "Wireless jamming attack detected!"), sensor and/or camera data from any devices 10 not impacted by the wireless jamming attack, and so forth. The cellular tower 140 may relay the emergency signal 138 to the desired party, such as the police, remote servers, security company, the homeowner 134, and so forth. Thus, even if the homeowner 134 fails to contact the authorities for any reason, the hub device 72 may act as a failsafe to ensure the authorities are notified. As a result, the hub device 72 may provide robust jamming attack detection and notification communication to handle these scenarios.

Figure 8:
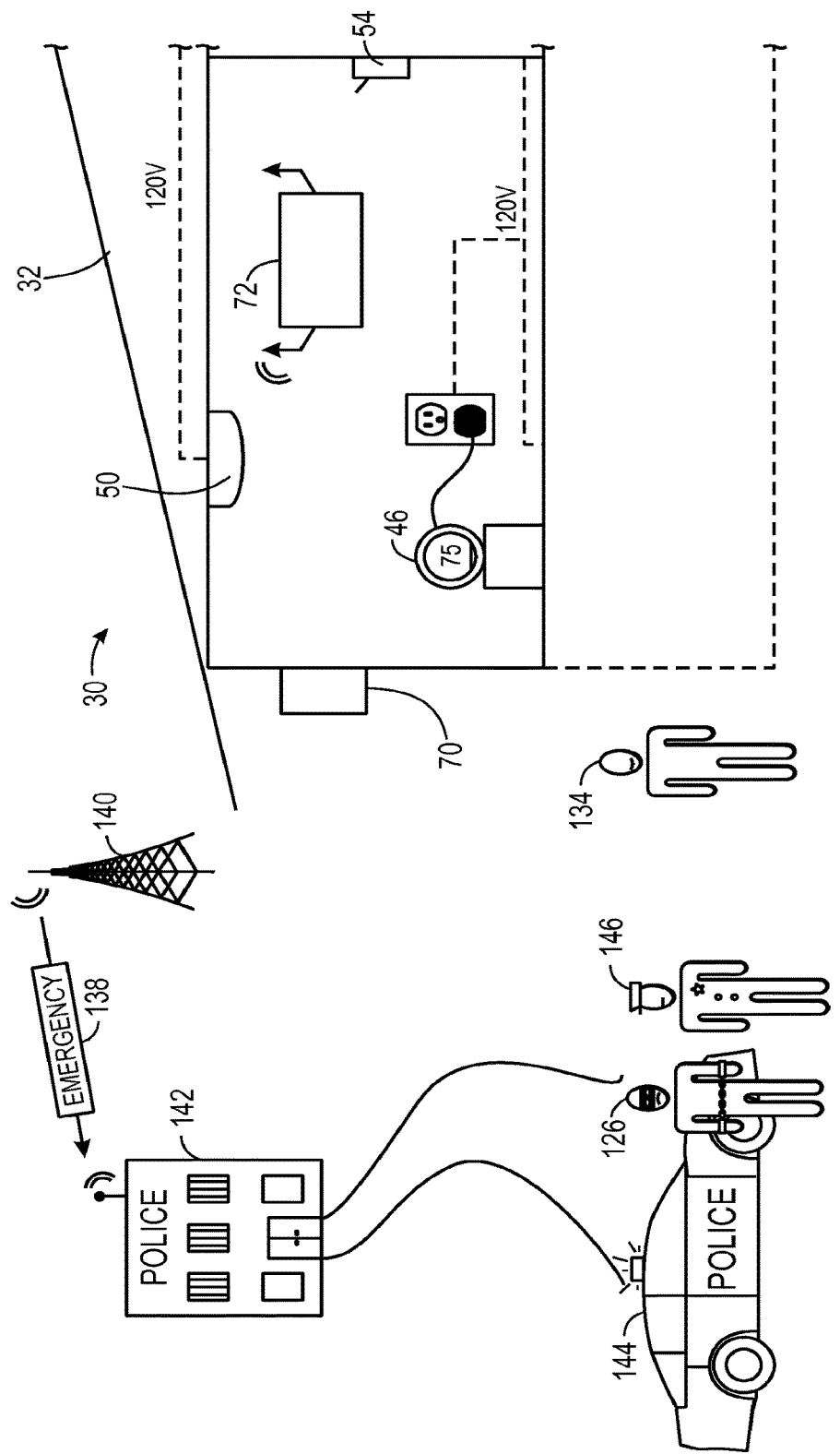
FIG. 8 illustrates the emergency signal being relayed from a cellular tower to authorities that respond to the emergency, in accordance with an embodiment.

To further illustrate, FIG. 8 depicts one possible outcome of the hub device 72 notifying the authorities of the jamming attack. In this example, the cellular tower 140 transmits the emergency signal 138 to the desired party (e.g., the police 142). The police 142 may receive the signal 138 and dispatch a squad car 144 to check on the incident. A police officer 146 may arrest the criminal 126. As may be appreciated, even if the criminal 126 is sophisticated enough to attempt to jam the wireless network, the teaching of this disclosure may identify its occurrence.

Figure 9:
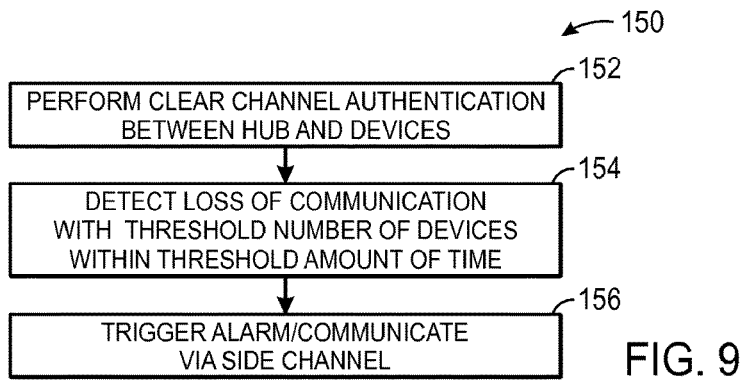
FIG. 9 illustrates a flowchart of a method for detecting the loss of communication between devices within certain thresholds by performing clear channel verification, in accordance with an embodiment.

Keeping the above example in mind, FIG. 9 illustrates a flowchart of a method 150 for detecting the loss of communication with devices 10 within certain thresholds by performing clear channel verification. The method may be implemented as computer instructions stored on a tangible, non-transitory computer readable medium (e.g., memory 27) that are executed by the processor 28. The method 150 may include performing clear channel verification between the hub device 72 and devices 10 (block 152), detecting the loss of communication with a threshold number of devices 10 within a threshold amount of time (block 154), and triggering an alarm and/or communicating via a side channel (block 156). However, it should be noted that the method 150 may enable detecting the loss of communication between any devices 10 that stop communicating with other devices 10. For example, if the thermostat 46 stops communicating with the hazard detector 50, the hub device 72 may detect that there is an issue.

More specifically, regarding block 152, the hub device 72 may perform clear channel verification between each device 10 that wirelessly communicates with it and with each other in the smart-home environment 30. As previously mentioned, each device 10 may communicate with the hub device 72 over a separate or the same channel within the frequency band, and each device 10 may communicate with each other over the wireless mesh network. Thus, the hub device 72 can perform clear channel verification on each channel to determine which channels are open or incapacitated. That is, the hub device 72 may transmit requests to the devices 10, and if the hub device 72 receives a response containing data that its processor 28 can decipher, the channel may be open. On the other hand, if the processor 28 does not receive a response to the request because of signal failure, then the channel for that particular device 10 may be incapacitated. If all of the channels are incapacitated, then the hub device 72 may infer that the wireless network is being attacked. The reason being is that the odds that all devices 10 in the smart-home environment 30, which may be multiple (e.g., greater than ten), have their channels incapacitated at the same time are extremely low. The more probable cause would be that the channels are being blocked by a jamming attack on the wireless network.

However, if one or two devices' channels are incapacitated, the hub device 72 may determine that there is not a jamming attack but, instead, those devices' batteries have died, are malfunctioning, or the like. As a result, the hub device 72 may notify the homeowner via the user interface component 14 and/or the speaker 29 to check those devices 10. Then, the homeowner may inspect the particular device 10 and alleviate the issue (e.g., change batteries). Additionally or alternatively, the hub device 72 may keep track of which devices' channels are incapacitated over time. That is, one device's channel may become incapacitated early in a month and the homeowner may neglect to replace its battery, for example. Then, throughout the month, other devices' channels may become incapacitated and, again, the homeowner may neglect to change their batteries. The hub device 72 may keep track of this gradual device 10 channel incapacitation so that if all the channels are eventually incapacitated at the same time, the hub device 72 may determine it is due to another reason besides a jamming attack.

In other words, the hub device 72 may learn the steady-state characteristics of the devices 10 within the smart-home environment 30, where the steady-state characteristics include typical maintenance of the devices 10 and/or typical operational deficiencies of the devices 10. For example, in a smart-home environment 30 that is dynamic in that the occupants often add/remove wireless networks or other electronic devices that negatively impact wireless communications between the hub device 72 and other devices, the hub device 72 learns that there may often (e.g., once every couple of months) be a loss in communication with a relatively small subset of devices (e.g., 20%). In contrast, in a smart-home environment 30 that is relatively static in that the occupants do not often add/remove wireless networks or other electronic devices that negatively impact wireless communications between the hub device 72 and other devices, the hub device 72 learns that there is seldomly (e.g., once every couple of years) a loss in communication with a relatively small subset of devices. Accordingly, the thresholds of 'number of devices' and 'amount of time' for notifying the occupants about an emergency condition indicative of a jamming attack may vary from household to household, where the threshold may be relatively high for dynamic smart-home environments 30 and relatively low for static smart-home environments 30.

In addition, the hub device 72 may keep track of the amount of time that certain devices 10 typically take to respond to a request. In this way, the hub device 72 may not determine that a jamming attack is occurring if one device 10 takes longer to respond to a request than another device 10. Furthermore, the hub device 72 may learn the devices 10 response rates in correlation to their battery level or bandwidth availability. For example, the hub device 72 may learn the response times for a device 10 over the course of its battery life. As the battery becomes more drained, its response time may become extended. In such a scenario, the hub device 72 can alert the user to replace the batteries soon. Also, the hub device 72 may learn each device's response times in correlation to their bandwidth. For example, a device 10 may take longer to respond if its bandwidth is low (e.g., it is busy handling other requests or processes) at certain times of the day. In such a case, the hub device 72 may determine that a jamming attack is not occurring and the particular device 10 is just busy.

Therefore, block 154 enables detecting loss of communication between a threshold number of devices 10 within a threshold amount of time. The threshold number of devices 10 may be configurable and be any number. For example, in some embodiments, the threshold number of devices 10 may be defaulted to a certain number, such as five. Setting a threshold number of devices 10 that stop communicating with each other may inhibit detecting jamming attacks incorrectly. As discussed above, if one or two devices 10 fail to communicate, it may be due to their batteries being dead, a malfunction, or the like. Further, setting a threshold amount of time that the threshold number of devices 10 fail to communicate within or threshold length of time the devices 10 have not communicated with each other may also inhibit detecting jamming attacks incorrectly. In some embodiments, the threshold amount of time may be configurable and defaulted to a certain length, such as one minute. If the threshold number of devices stop communicating within the one minute time threshold, then the hub device 72 may determine that there is a jamming attack. Further, the hub device 72 may also analyze whether the threshold number of devices stop communicating for a threshold length of time. The time limit may be beneficial because devices 10 may stop communicating with each other briefly (e.g., ten seconds) and then begin communicating again. Take for example, when a user restarts a device 10, such as a router/modem 60, the device 10 may be shut down for a period of time and then is back online fairly quickly. Therefore, the hub device 72 may wait a threshold amount of time and recheck the incapacitated channels to ensure that the devices 10 are actually being jammed, but the length of time should not be so long (e.g., an hour) that the criminal 126 can execute his or her plan.

Additionally or alternatively, each device 10 communicating in the wireless network may communicate with the hub device 72 at predetermined times, such as every minute, five minutes, and so forth. And, if a device 10 fails to communicate with the hub device 72 at that time, the hub device 72 may be put on alert of a possible jamming attack. As such, the hub device 72 may wait for the other devices 10 to check in at their predetermined times, and if they fail to communicate at those times, then the hub device 72 may infer that the network is under attack. Again, the hub device 72 may not make this inference unless a threshold number of devices 10 fail to communicate at their predetermined times in order to inhibit incorrectly announcing a jamming attack.

After the hub device 72 has detected a loss of communication between a threshold number of devices within a threshold amount of time (block 154), the hub device 72 will trigger an alarm and/or communicate via a side channel (block 156). In some embodiments, the alarm may be emitted via the speaker 29 included in the hub device 72. It may include a siren, noise, spoken phrase, or a combination thereof. The alarm may be audibly loud enough so that the criminal 126 may hear it and be deterred from proceeding with his plan. Additionally, the hub device 72 may leverage its side channel communication to send the emergency signal since the wireless network is being jammed. As previously discussed, the side communication channel may include utilizing the cellular component 26 (e.g., 3G, 4G, LTE) to transmit the signal to a cellular tower 140, which may transmit the signal to a desired party, such as the authorities, the security company, or the homeowner's cell phone. Thus, if the homeowner is not at home, the hub device 72 may alert the homeowner that his or her home network is being subjected to a jamming attack. Further, the authorities may respond appropriately after receiving the emergency signal and, as seen in the above example, may thwart the criminal's plot.

Figure 10:
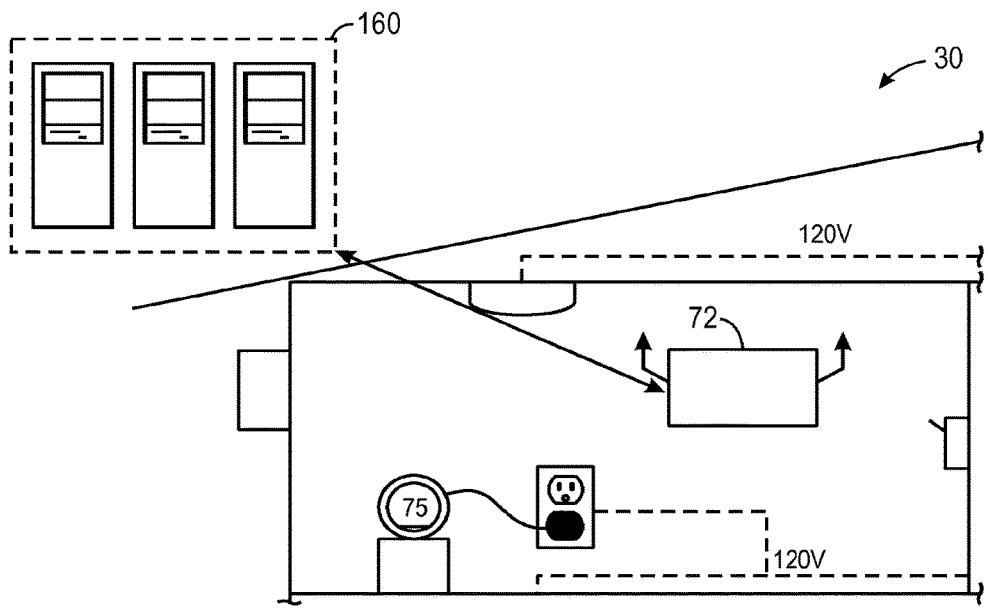
FIG. 10 illustrates remote servers pinging the hub device to determine whether it is subject to a jamming attack, in accordance with an embodiment.

In another embodiment, remote servers 160 may ping the hub device 72 to determine whether the hub device 72 is subject to a jamming attack, as depicted in FIG. 10. The remote servers 160 may be Nest® servers, and they may routinely ping the hub device 72 or other devices 10 in the smart-home environment 30. If there is no return signal from the hub device 72, either via the Internet 62 or 3G, within a predetermined period of time, an alert can be transmitted from the remote servers 160 to the homeowner, authorities, security company, or the like. The threshold amount of time the remote servers 160 waits for a response may be configurable and set to a default value (e.g., one second, ten seconds). The alert may indicate that a wireless communication jamming attack has been detected. Further, the servers 160 may initially ping the hub device 72 over a wireless network and if the hub device 72 does not respond within a threshold period of time, the servers 160 may ping the hub device 72 over a wired network connection to determine whether the wireless network is subject to a wireless communication jamming attack or whether the hub device 72 is just inoperable.

In yet another embodiment, the hub device 72 may be configured to perform a confirmation of failure process. For example, if the hub device 72 suspects that there is a jamming attack (e.g., 10% of the devices 10 are being affected), the hub device 72 may try to wake all nodes, or an important subset of the nodes (e.g., devices 10 that are capable of performing occupancy detection, video recording, audio recording, etc.). If another threshold (e.g., 20%) of those devices 10 do not respond, then the hub device 72 may determine an emergency condition, such as a jamming attack. This confirmation of failure process recognizes that some of the nodes (e.g., devices 10) may be "sleepy" nodes in that they enter a sleep mode after a period of non-activity. While the sleepy nodes may take sensor readings and buffer them while sleeping, the sleepy nodes may only communicate with the hub device 72 intermittently (e.g., every 90 seconds). Thus, if the hub device 72 suspects a jamming attack, it can instruct the sleepy nodes to stay awake after they check in with the hub device 72. If the sleepy node successfully stays awake and continues to communicate with the hub device 72, then the hub device 72 may determine that a jamming attack is not occurring. However, if the sleepy node does not stay awake, and, especially, if it fails to check in, the hub device 72 is more likely to determine that it is subject to a jamming attack.

Figure 11:
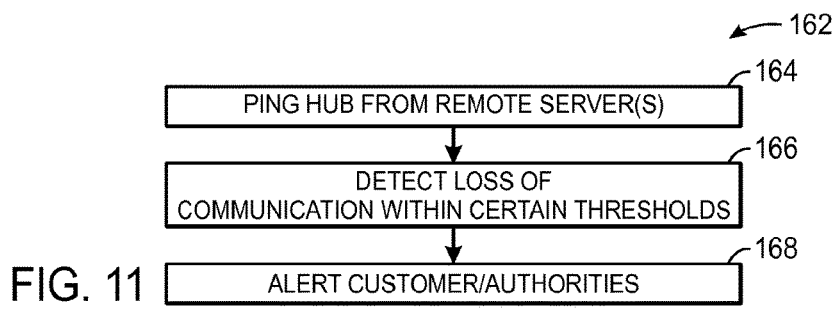
FIG. 11 illustrates a flowchart of a method for detecting the loss of communication with devices within certain thresholds by pinging the hub device from remote servers, in accordance with an embodiment.

A method 162 describing the above embodiment is illustrated in FIG. 11. The method 162 may be implemented as computer instructions stored on a tangible, non-transitory computer-readable medium that are executed by one or more processors of the remote servers 160. The method 162 may include pinging the hub device 72 from remote servers 160 (block 164), detecting a loss of communication within certain thresholds (block 166), and alerting the homeowner, authorities, and/or security company if detected (block 168). It should be understood that the remote servers 160 may utilize this method 162 for any or all devices 10 that are capable of communicating in the smart-home environment 30 and not just the hub device 72. More specifically, block 164 may include the remote servers 160 pinging the hub device 72 and/or any other device 10 in the smart-home environment 30 to determine whether it is able to communicate over the wireless network as expected. Generally, the hub device 72 and/or other devices 10 should send a response signal to the remote servers 160 very quickly (e.g., milliseconds) since there may not be a large number of nodes to pass through between the remote servers 160 and the hub device 72 and/or other devices 10. Thus, in block 166, the method 162 will detect a loss of communication with the hub device 72 and/or other devices 10 if they do not respond within a certain threshold amount of time, as described above.

Further, in some embodiments, the remote servers 160 may try pinging the hub device 72 and/or other devices 10 a threshold number of times before inferring that action needs to be taken. For example, the remote servers 160 may ping the hub device 72 and wait the threshold amount of time, which may be one second. If the hub device 72 does not respond within one second, the remote servers 160 may continue to ping the hub device 72 again every second until either a response is returned to the remote servers 160 or the threshold number of tries has been exceeded, at which point the remote servers 160 may notify the homeowner, authorities, security company, or the like, of a potential wireless network jamming attack.

Figure 12:
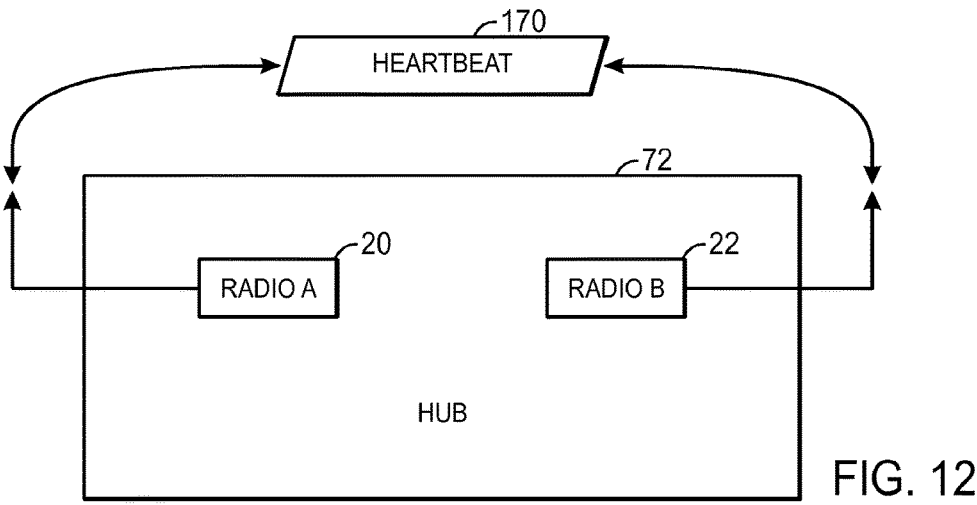
FIG. 12 illustrates a hub device including two radios that transmit heartbeat signals to one another, in accordance with an embodiment.

In certain embodiments, as illustrated in FIG. 12, the hub device 72 may include at least two radios (e.g., radio A 20 and radio B 22) that transmit heartbeat signals 170 to one another. It should be noted that any or all of the other devices 10 in the smart-home environment 30 may be equipped with these radios 20 and 22 that send heartbeat signals 170 to each other. In an embodiment, one of the radios 20 and/or 22 may be a higher power radio that communicates via WiFi and the other radio may be a lower power radio that communicates via Bluetooth® low energy (BLE), for example. The radios 20 and 22 may be configured to communicate via 802.11 wireless networks, 802.15.4 wireless networks, and the like.

This embodiment may be beneficial at least to the extent that there is a channel overlap between two devices 10 in the network. That is, if the hub device 72 performs clear channel verification on one channel shared by more than one device 10, one of the devices that is not jammed may respond to the hub device 72, which may infer that the channel is open even though another device 10 on the same channel is being jammed. Thus, the device 10 that is being jammed may utilize its radios to emit the heartbeat signal 170 from radio A 20 and try to detect the signal 170 on radio B 22. If radio B 22 detects the heartbeat signal 170, then the wireless network may not be jammed. However, if radio B 22 fails to detect the heartbeat signal 170, the hub device 72 and/or other devices 10 may determine that the network is under a jamming attack. As a result, the hub device 72 and/or other devices 10 may trigger the alarm and/or communicate via the side channel (3G cellular component) to a desired party. As may be appreciated, this self-monitoring heartbeat feature of the devices 10 further adds to the robustness of the jamming attack detection techniques.

Figure 13:
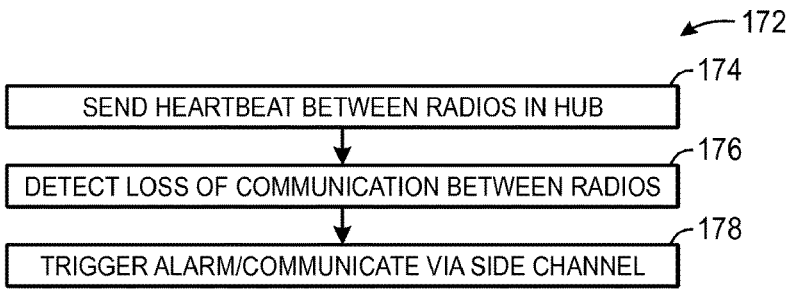
FIG. 13 illustrates a flowchart of a method for detecting the loss of communication between the radios using the heartbeat signals, in accordance with an embodiment.

A method 172 describing the radio heartbeat embodiment described above is illustrated in FIG. 13. The method 172 may be implemented as computer instructions stored on a tangible, non-transitory computer readable medium (e.g., memory 27) that are executed by the processor 28. The method 172 may include sending a heartbeat signal 170 between radios 20 and 22 in the hub device 72 and/or other devices 10 (block 174), detecting a loss of communication between the radios 20 and 22 (block 176), and triggering an alarm and/or communicating via a side channel if detected (block 178). More specifically, block 174 may include transmitting the heartbeat signal 170 by radio A 20 and/or radio B 22 and trying to detect the signal 170 at the other radio. The frequency of transmitting the heartbeat signal 170 may be predetermined, for example every few seconds, a minute, five minutes, and so forth. Additionally or alternatively, the frequency of transmission may be configurable by the homeowner and/or remote servers. The frequency of the radiowave transmitted may also be predetermined, for example 800 Mhz, 802 Mhz, 804 Mhz, 900 Mhz, 902 Mhz, in the kHz range, GHz range, etc.

Further, detecting a loss of communication between the radios 20 and 22 (block 176) may depend on a number of factors. In some embodiments, the hub device 72 and/or other devices 10 may determine that the network is under a jamming attack after one heartbeat signal 170 is missed. However, in other embodiments, blocks 174 and 176 may be repeated a desired amount of times. That is, the hub device 72 and/or other devices 10 may send a threshold number of heartbeat signals 170 that fail to be detected by one of the radios before inferring there is loss of communication between the radios 20 and 22. Further, the radios 20 and 22 may wait a threshold amount of time between each heartbeat signal 170 to see if the noise that was blocking the signal was temporary. Additionally or alternatively, after an initial heartbeat signal 170 fails to be detected, the higher power radio may transmit a signal 170 with a much higher voltage to try to determine whether the network is being jammed. A signal with a higher voltage may be more likely to be received by the second radio if there is some noise in the network. In any embodiment, when the hub device 72 and/or other devices 10 determines a loss of communication between the radios 20 and 22, the hub device 72 and/or other devices 10 may trigger the alarm and/or communicate via a side channel (e.g., 3G cellular component) to send a distress signal to a desired party.

Figure 14:
FIG. 14 illustrates a hub device wired to another device, in accordance with an embodiment.

In some cases, it may be desirable for the hub device 72 to confirm that a jamming attack is underway with a device 10 that is connected via a wire 180, as illustrated in FIG. 14. The hub device 72 may utilize its wired component 24, which may be an Ethernet port, to connect to another device 10. In one embodiment, the connected device 10 may be a router 60 and it may be further connected to the Internet 62. When requested, the router 60 may confirm whether the jamming attack detected by the hub device 72 is legitimate or if the wireless network is still available but the devices 10 in the network are inoperable. To achieve this, the device 10 may ping the devices 10 in the wireless network to see if they respond. If none of the devices 10 respond or the router 60 determines that the network is unavailable, then the device 10 may return a jamming attack confirmation to the hub device 72. As a result, the hub device 72, may trigger the alarm and/or communicate via a side channel or request the router 60 connected to the Internet 62 to communicate to a desired party.

In another embodiment, the connected device 10 may be any of the devices 10 located in the home environment 30 and the device 10 may not be connected to the Internet 62 via a wire. When asked, the connected device 10 may attempt to wirelessly communicate with other devices 10 throughout the home environment 30. If the connected device 10 is successfully able to communicate with other devices 10 over the wireless mesh network, then the connected device 10 will not confirm a jamming attack. On the other hand, if the connected device 10 is not able to communicate with a threshold number of devices 10 within a threshold amount of time over the wireless mesh network, then it may return a jamming attack confirmation to the hub device 72. As a result, the hub device 72, may trigger the alarm and/or communicate via a side channel or request the device 10 to communicate an emergency signal.

Additionally, in an embodiment, if a hub device 72 fails to receive the transmitted heartbeat signal between its radios 20 and 22, then the hub device 72 may be configured to confirm with other hub devices 72 whether their heartbeat signals are also failing. For example, the hub device 72 with the failing heartbeat may ask a second (or third, fourth, etc.) hub device 72 to ascertain whether those other hub devices 72 have also lost their heartbeat. If the other hub devices 72 have lost their heartbeats, too, then the hub device 72 may trigger the alarm or transmit an emergency signal via a side channel.

Figure 15:
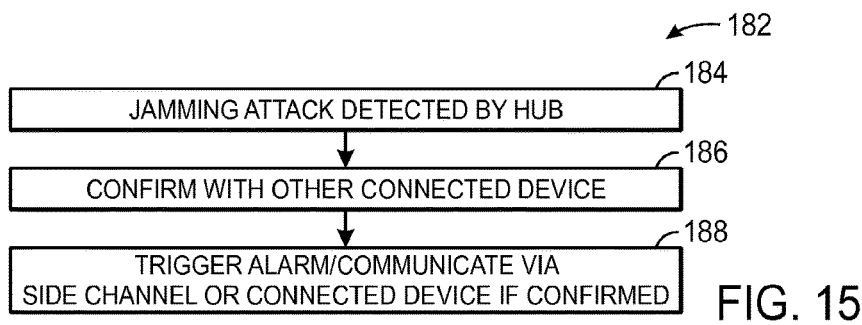
FIG. 15 illustrates a flowchart of a method in which the hub device confirms a perceived jamming attack with a wired device, in accordance with an embodiment.

A method 182 for the hub device 72 confirming a detected jamming attack with a wired device 10 is illustrated in FIG. 15. The method 182 may be implemented as computer instructions stored on a tangible, non-transitory computer readable medium (e.g., memory 27) that are executed by the processor 28. The method may include detecting a jamming attack by the hub device 72 (block 184), confirming the jamming attack with a wired device 10 (block 186), and triggering the alarm and/or communicating via a side channel or requesting the wired device 10 to communicate to a desired party if detected (block 188). More specifically, in block 184 the hub device 72 may detect the jamming attack using one of the embodiments described above. Once detected, the hub device 72 may request a device 10 that is wired to the hub device 72 (e.g., via an Ethernet cable or the like) to confirm that a jamming attack on the wireless network is indeed underway.

As previously discussed, the device may be a router 60 connected to the Internet 62 via another wire. The router 60 may try to ping devices 10 that are communicating within the wireless network to determine whether the network is available. Further, the router 60 may try to ping the wireless network to see if it responds. If it the devices 10 respond or the network returns a response, then the wired device 10 may determine that there is no jamming attack and the hub device 72 has misdiagnosed the failed communications. As a result, the router 60 may notify the hub device 72 that the wireless network is available and the hub device 72 may not trigger the alarm.

On the other hand, if the router 60 does not receive a response from the devices 10 in the smart-home environment 30 or from the network, then the router 60 may determine that the network is being subjected to a jamming attack. As a result, the router 60 may return a jamming attack confirmation to the hub device 72, which may then trigger the alarm and/or communicate via a side channel (e.g., 3G, 4G) that a jamming attack has been detected (block 188). Additionally or alternatively, the hub device 72 may request the router 60 to communicate via the Internet 62 to a desired party, such as the authorities, the homeowner, the security company, or the like, that a jamming attack has been detected.

Also, in other embodiments, the connected device 10 may be another device 10 in the smart home environment 30, such as a hazard detector 50, thermostat 46, and so forth. The hub device 72 may request the connected device 10 to confirm the detected jamming attack in block 186, and the connected device 10 may attempt to communicate with other devices in the smart-home environment 30 via the wireless mesh network. If the connected device 10 also fails to receive responses from a threshold amount of devices 10, then the connected device 10 may confirm that a jamming attack is underway. As a result, the hub device 72 may then trigger the alarm and/or communicate via a side channel (e.g., 3G, 4G) that a jamming attack has been detected (block 188). Additionally or alternatively, the hub device 72 may request the connected device 10 to communicate via its side channel to a desired party, such as the authorities, the homeowner, the security company, or the like, that a jamming attack has been detected.

This written description uses examples to disclose the techniques, including the best mode, and also to enable any person skilled in the art to practice the techniques, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An electronic device, comprising:
   a power source configured to provide operational power to the electronic device;
   a network interface comprising a wireless radio, the wireless radio being configured to wirelessly communicate with a plurality of electronic devices over one or more wireless channels; and
   a processor in communication with the network interface, the processor being configured to:
   learn steady-state characteristics of the plurality of electronic devices that communicate over the one or more wireless channels;
   perform a clear channel verification utilizing the network interface of the one or more wireless channels, wherein the clear channel verification considers the steady-state characteristics when performing the clear channel verification; and
   determine, based on the clear channel verification, whether any wireless channels of the one or more wireless channels are incapacitated.

2. The electronic device of claim 1, wherein the processor is further configured to: determine that a wireless network is being jammed based upon at least a threshold number of the one or more wireless channels being incapacitated within a threshold period of time.

3. The electronic device of claim 1, wherein the processor is further configured to detect a loss of communication with one or more of the plurality of electronic devices via the one or more wireless channels as part of the clear channel verification.

4. The electronic device of claim 1, wherein the processor is configured to perform the clear channel verification on each of the one or more wireless channels due to at least one electronic device of the plurality of electronic devices using the one or more wireless channels for communication with the electronic device.

5. The electronic device of claim 1, wherein the electronic device is a smart-home hub device that communicates with a plurality of smart-home devices, wherein the plurality of smart-home devices comprises the plurality of electronic devices.

6. The electronic device of claim 1, wherein the processor is further configured to cause an alarm to be transmitted via a side channel in response to determining any of the wireless channels of the one or more wireless channels are incapacitated, wherein the side channel is at a frequency distinct from frequencies of the one or more wireless channels.

7. The electronic device of claim 1, further comprising a speaker, wherein the processor is configured to cause an alert to be output via the speaker in response to determining that any wireless channel of the one or more wireless channels are being jammed.

8. The electronic device of claim 1, wherein the processor being configured to perform the clear channel verification comprises the processor being configured to:
   transmit a request to each of the plurality of electronic devices via the one or more wireless channels; and determine if a response containing data was received from each of the plurality of electronic devices that is decipherable by the processor.

9. A tangible, non-transitory computer-readable medium comprising instructions configured to be executed by one or more processors of an electronic device, the instructions causing the one or more processors to:
learn steady-state characteristics of one or more electronic devices that communicate over one or more wireless channels;
perform a clear channel verification of the one or more wireless channels utilizing a wireless network interface, wherein the clear channel verification considers the steady-state characteristics when performing the clear channel verification; and
determine, based on the clear channel verification, whether any wireless channels of the one or more wireless channels are incapacitated.

10. The tangible, non-transitory computer-readable medium of claim 9, wherein the instructions further cause the one or more processors to:
determine that a wireless network is being jammed based upon at least a threshold number of the one or more wireless channels being incapacitated within a threshold period of time.

11. The tangible, non-transitory computer-readable medium of claim 9, wherein the instructions further cause the one or more processors to:
perform the clear channel verification on each of the one or more wireless channels due to at least one electronic device of the one or more electronic devices using the one or more wireless channels for communication with the electronic device.

12. The tangible, non-transitory computer-readable medium of claim 9, wherein the electronic device is a smart-home hub device that communicates with one or more smart-home devices, wherein the one or more smart-home devices comprises the one or more electronic devices.

13. The tangible, non-transitory computer-readable medium of claim 9, wherein the one or more processors being configured to perform the clear channel verification comprises the one or more processors being configured to:
cause a request to be transmitted to each of the one or more electronic devices via the one or more wireless channels; and
determine if a response containing data was received from each of the one or more electronic devices that is decipherable.

14. A smart-home device system, comprising:
a plurality of smart-home devices; and
a smart-home hub device, comprising:
a power source configured to provide operational power to the smart-home hub device;
a network interface comprising a wireless radio, the wireless radio being configured to wirelessly communicate with the plurality of smart-home devices over one or more wireless channels; and
a processor in communication with the network interface, the processor being configured to:
learn steady-state characteristics of the plurality of smart-home devices that communicate over the one or more wireless channels;
perform a clear channel verification utilizing the network interface of the one or more wireless channels, wherein the clear channel verification considers the steady-state characteristics when performing the clear channel verification; and
determine, based on the clear channel verification, whether any wireless channels of the one or more wireless channels are incapacitated.

15. The smart-home device system of claim 14, wherein the processor of the smart-home hub device is further configured to: determine that a wireless network is being jammed based upon at least a threshold number of the one or more wireless channels being incapacitated within a threshold period of time.

16. The smart-home device system of claim 14, wherein the processor of the smart-home hub device is further configured to detect a loss of communication with one or more of the plurality of smart-home devices via the one or more wireless channels as part of the clear channel verification.

17. The smart-home device system of claim 14, wherein the processor of the smart-home hub device is configured to perform the clear channel verification on each of the one or more wireless channels due to at least one smart-home device of the plurality of smart-home devices using the one or more wireless channels for communication with the smart-home hub device.

18. The smart-home device system of claim 14, wherein the processor of the smart-home hub device is further configured to cause an alarm to be transmitted via a side channel in response to determining any of the wireless channels of the one or more wireless channels are incapacitated, wherein the side channel is at a frequency distinct from the frequencies of the one or more wireless channels.

19. The smart-home device system of claim 14, wherein the smart-home hub device further comprising a speaker, wherein the processor is configured to cause an alert to be output via the speaker in response to determining that any wireless channel of the one or more wireless channels are being incapacitated.

20. The smart-home device system of claim 14, wherein the processor of the smart-home hub device being configured to perform the clear channel verification comprises the processor being configured to:
transmit a request to each of the plurality of smart-home devices via the one or more wireless channels; and
determine if a response containing data from each of the plurality of smart-home devices was received that is decipherable by the processor.

* * * * *